(12) United States Patent
Lee et al.

(10) Patent No.: US 11,343,837 B2
(45) Date of Patent: *May 24, 2022

(54) METHOD FOR TRANSMITTING/RECEIVING DATA IN WIRELESS COMMUNICATION SYSTEM, AND DEVICE FOR SUPPORTING SAME

(71) Applicant: LG Electronics Inc., Seoul (KR)

(72) Inventors: Hyunho Lee, Seoul (KR); Kyuhwan Kwak, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/005,738

(22) Filed: Aug. 28, 2020

(65) Prior Publication Data

US 2021/0007123 A1 Jan. 7, 2021

Related U.S. Application Data

(63) Continuation of application No. 16/649,896, filed as application No. PCT/KR2019/005154 on Apr. 29, 2019, now Pat. No. 10,856,314.

(Continued)

(51) Int. Cl.
*H04W 72/12* (2009.01)
*H04L 5/00* (2006.01)
(Continued)

(52) U.S. Cl.
CPC ....... *H04W 72/1268* (2013.01); *H04L 5/0007* (2013.01); *H04L 27/2607* (2013.01);
(Continued)

(58) Field of Classification Search
None
See application file for complete search history.

(56) References Cited

U.S. PATENT DOCUMENTS

2010/0238823 A1* 9/2010 Chen .............. H04L 1/1822
370/252
2015/0271006 A1* 9/2015 Han ............... H04L 1/0061
370/329
(Continued)

FOREIGN PATENT DOCUMENTS

| JP | 2010011443 | 1/2010 |
| KR | 1020160108544 | 9/2016 |
| WO | WO2018063056 | 4/2018 |

OTHER PUBLICATIONS

CATT, "Remaining issues on DMRS," R1-1801724, 3GPP TSG RAN WG1 Meeting #92, Athens, Greece, dated Feb. 26-Mar. 2, 2018, 21 pages.
(Continued)

*Primary Examiner* — Anh Ngoc M Nguyen
(74) *Attorney, Agent, or Firm* — Fish & Richardson P.C.

(57) ABSTRACT

The disclosure proposes a method for transmitting/receiving data in a wireless communication system and apparatus for supporting the same. Specifically, a method of transmitting an uplink data channel by a user equipment (UE) in a wireless communication system comprises receiving, from a base station, first downlink control information for scheduling an uplink data channel in an nth transmission time unit, receiving, from the base station, second downlink control information for scheduling an uplink data channel in an n+kth transmission time unit, and when information by the first downlink control information is inconsistent with information by the second downlink control information, transmitting an uplink data channel which is based on the first downlink control information to the base station, wherein the second downlink control information may be discarded by the UE.

15 Claims, 21 Drawing Sheets

Related U.S. Application Data

(60) Provisional application No. 62/666,080, filed on May 2, 2018.

(51) Int. Cl.
    *H04L 27/26*     (2006.01)
    *H04W 72/04*     (2009.01)

(52) U.S. Cl.
    CPC ....... *H04L 27/2613* (2013.01); *H04W 72/042* (2013.01); *H04W 72/0446* (2013.01)

(56) References Cited

U.S. PATENT DOCUMENTS

| | | |
|---|---|---|
| 2017/0230994 A1 | 8/2017 | You et al. |
| 2018/0054809 A1* | 2/2018 | Zhu .................. H04W 4/12 |
| 2020/0162220 A1 | 5/2020 | Yang |
| 2020/0196333 A1 | 6/2020 | Lin |

OTHER PUBLICATIONS

Panasonic, "UL simultaneous transmission between sTTI and TTI," R1-1612108, 3GPP TSG RAN WG1 Meeting #87, Reno, USA, dated Nov. 14-18, 2016, 3 pages.

Qualcomm Incorporated, "Summary of DL/UL scheduling and HARQ management," R1-1805540, 3GPP TSG-RAN WG1 Meeting #92bis, Sanya, China, dated Apr. 16-20, 2018, 25 pages.

Huawei et al., "Additional DMRS position pattern for subslot #5," R1-1803715, Presented at 3GPP TSG RAN WG1 Meeting #92bis, Sanya, China, Apr. 16-20, 2018, 6 pages.

LG Electronics, "Remaining Details of UL/DL Reconfiguration Signaling in TDD eIMTA," R1-140298, Presented at 3GPP TSG RAN WG1 Meeting #76, Prague, Czech Republic, Feb. 10-14, 2014, 4 pages.

Notice of Allowance in Japanese Appln. No. 2020-520209, dated Nov. 9, 2021, 5 pages (with English translation).

* cited by examiner

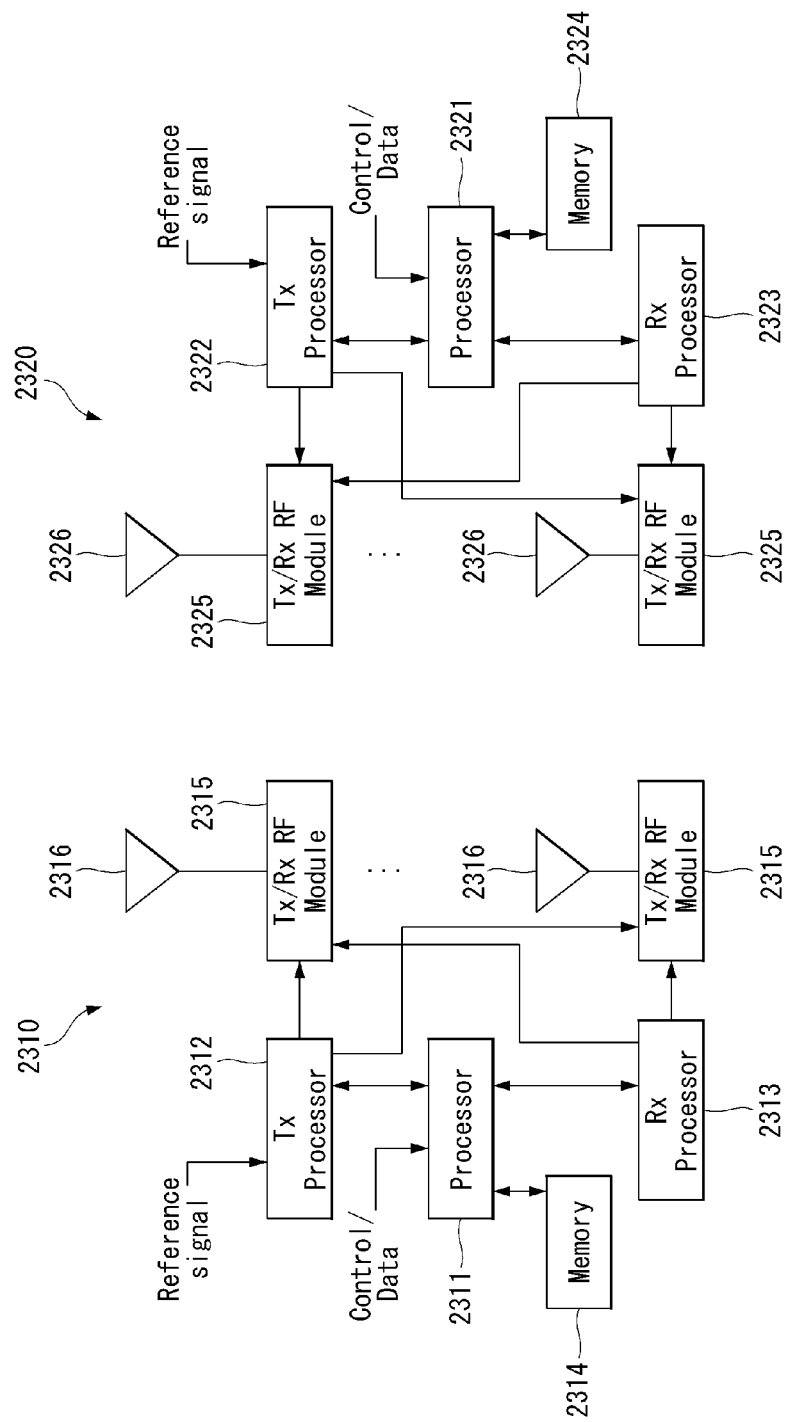

METHOD FOR TRANSMITTING/RECEIVING DATA IN WIRELESS COMMUNICATION SYSTEM, AND DEVICE FOR SUPPORTING SAME

CROSS-REFERENCE TO RELATED APPLICATION

This application is a continuation of U.S. application Ser. No. 16/649,896, filed on Mar. 23, 2020, which is the National Stage application under 35 U.S.C. § 371 of International Application No. PCT/KR2019/005154, filed on Apr. 29, 2019, which claims the benefit of U.S. Provisional Application No. 62/666,080, filed on May 2, 2018. The contents of which are all hereby incorporated by reference herein in their entirety.

TECHNICAL FIELD

The disclosure relates to a method for transmitting and receiving data in a wireless communication system and, more particularly, to a method of transmitting and receiving a downlink channel and/or an uplink channel and an apparatus supporting the same.

BACKGROUND ART

Mobile communication systems have been developed to provide voice services, while ensuring the activity of users. However, coverage of the mobile communication systems has extended up to data services, as well as voice service. Today, an explosive increase in traffic has caused the shortage of resources. Accordingly, an advanced mobile communication system is necessary because users want relatively high speed services.

Requirements for a next-generation mobile communication system include the accommodation of explosive data traffic, a significant increase in the transfer rate per user, the accommodation of the number of considerably increased connection devices, very low end-to-end latency, and high energy efficiency. To this end, research of various technologies, such as dual connectivity, massive multiple input multiple output (MIMO), in-band full duplex, non-orthogonal multiple access (NOMA), super wideband, and device networking, is carried out.

DETAILED DESCRIPTION OF THE DISCLOSURE

Technical Problems

The disclosure provides a method of transmitting and receiving a downlink channel and/or an uplink channel.

Specifically, the disclosure provides a method of scheduling and/or transmitting and receiving a downlink channel by considering the sharing and/or repetition of a demodulation reference signal (DMRS) in relation to the transmission and reception of the downlink channel.

The disclosure aims to provide a method of perform uplink channel transmission/reception based on specific downlink control information considering that there is a setting and/or indication in which a plurality of pieces of downlink control information are inconsistent with each other in relation to uplink channel transmission/reception.

Technical objects to be achieved in the disclosure are not limited to the above-described technical objects, and other technical objects not described above may be evidently understood by a person having ordinary skill in the art to which the disclosure pertains from the following description.

Technical Solutions

According to an embodiment of the disclosure, a method of transmitting an uplink data channel by a user equipment (UE) in a wireless communication system comprises receiving, from a base station, first downlink control information for scheduling an uplink data channel in an nth transmission time unit, receiving, from the base station, second downlink control information for scheduling an uplink data channel in an n+kth transmission time unit, and when information by the first downlink control information is inconsistent with information by the second downlink control information, transmitting an uplink data channel which is based on the first downlink control information to the base station, wherein the second downlink control information may be discarded by the UE.

According to an embodiment of the disclosure, in the method, the first downlink control information and the second downlink control information each may include at least one of information for a demodulation reference signal (DMRS) pattern related to the uplink data channel, information for a cyclic shift, information for interleaved frequency division multiple access (IFDMA) comb, information for a resource allocation, information for precoding, and/or information for the number of layers.

According to an embodiment of the disclosure, in the method, when the information by the first downlink control information is inconsistent with the information by the second downlink control information, an inconsistency may occur in the DMRS pattern information.

According to an embodiment of the disclosure, in the method, the DMRS pattern included in the first downlink control information may indicate DMRS transmission for the uplink data channel at a first symbol in the n+kth transmission time unit, and the DMRS pattern included in the second downlink control information may not indicate DMRS transmission for the uplink data channel at the first symbol in the n+kth transmission time unit.

According to an embodiment of the disclosure, in the method, when the information by the first downlink control information is inconsistent with the information by the second downlink control information, an inconsistency may occur in at least one of the cyclic shift information, the IFDMA comb information, the resource allocation information, the precoding information, and/or the number-of-layers information.

According to an embodiment of the disclosure, in the method, the DMRS pattern included in the first downlink control information and the DMRS pattern included in the second downlink control information may indicate DMRS transmission for the uplink data channel at the first symbol in the n+kth transmission time unit.

According to an embodiment of the disclosure, in the method, k may be 1, and the nth transmission time unit may be placed continuously with the n+kth transmission time unit.

According to an embodiment of the disclosure, in the method, the nth transmission time unit and the n+kth transmission time unit each may be a subslot including two or three orthogonal frequency division multiplexing (OFDM) symbols.

According to an embodiment of the disclosure, a user equipment (UE) transmitting an uplink data channel in a wireless communication system comprises a transceiver for transmitting or receiving a wireless signal and a processor functionally connected with the transceiver, wherein the processor may performs control to receive, from a base station, first downlink control information for scheduling the uplink data channel in an nth transmission time unit, receive, from the base station, second downlink control information for scheduling the uplink data channel in an n+kth transmission time unit, and when information by the first downlink control information is inconsistent with information by the second downlink control information, transmit the uplink data channel which is based on the first downlink control information to the base station, wherein the second downlink control information may be discarded by the UE.

According to an embodiment of the disclosure, in the UE, the first downlink control information and the second downlink control information each may include at least one of information for a demodulation reference signal (DMRS) pattern related to the uplink data channel, information for a cyclic shift, information for interleaved frequency division multiple access (IFDMA) comb, information for a resource allocation, information for precoding, and/or information for the number of layers.

According to an embodiment of the disclosure, in the UE, when the information by the first downlink control information is inconsistent with the information by the second downlink control information, an inconsistency may occur in the DMRS pattern information.

According to an embodiment of the disclosure, in the UE, the DMRS pattern included in the first downlink control information may indicate DMRS transmission for the uplink data channel at a first symbol in the n+kth transmission time unit, and the DMRS pattern included in the second downlink control information may not indicate DMRS transmission for the uplink data channel at the first symbol in the n+kth transmission time unit.

According to an embodiment of the disclosure, in the UE, when the information by the first downlink control information is inconsistent with the information by the second downlink control information, an inconsistency may occur in at least one of the cyclic shift information, the IFDMA comb information, the resource allocation information, the precoding information, and/or the number-of-layers information.

According to an embodiment of the disclosure, in the UE, the DMRS pattern included in the first downlink control information and the DMRS pattern included in the second downlink control information may indicate DMRS transmission for the uplink data channel at the first symbol in the n+kth transmission time unit.

According to an embodiment of the disclosure, a base station receiving an uplink data channel in a wireless communication system comprises a transceiver for transmitting or receiving a wireless signal and a processor functionally connected with the transceiver, wherein the processor may perform control to transmit, to a user equipment (UE), first downlink control information for scheduling the uplink data channel in an nth transmission time unit, transmit, to the UE, second downlink control information for scheduling the uplink data channel in an n+kth transmission time unit, and when information by the first downlink control information is inconsistent with information by the second downlink control information, receive, from the UE, the uplink data channel which is based on the first downlink control information, wherein the second downlink control information may be discarded by the UE.

Advantageous Effects

According to an embodiment of the disclosure, there is an effect in that the ambiguity of a user equipment operation which may occur when a DMRS indicated by DCI, etc. is absent or present can be removed by clarifying a behavior of a user equipment related to DMRS sharing.

Furthermore, according to an embodiment of the disclosure, there is an effect in that an operation for 3-layer or more PDSCHs is made possible and/or a reduction in the data rate can be prevented by clarifying a behavior of a user equipment related to a DMRS repetition.

According to an embodiment of the disclosure, it is possible to address the UE's behavior ambiguity even when inconsistent settings and/or indications are transferred by a plurality of pieces of downlink control information.

Effects which may be obtained in the disclosure are not limited to the above-described effects, and other technical effects not described above may be evidently understood by a person having ordinary skill in the art to which the disclosure pertains from the following description.

BRIEF DESCRIPTION OF THE DRAWINGS

The accompanying drawings, which are included to provide a further understanding of the disclosure and constitute a part of the detailed description, illustrate embodiments of the disclosure and together with the description serve to explain the principle of the disclosure.

FIG. 23 is a block diagram illustrating another example configuration of a wireless communication device to which methods proposed according to the disclosure are applicable.

MODE FOR CARRYING OUT THE DISCLOSURE

Figure 1:
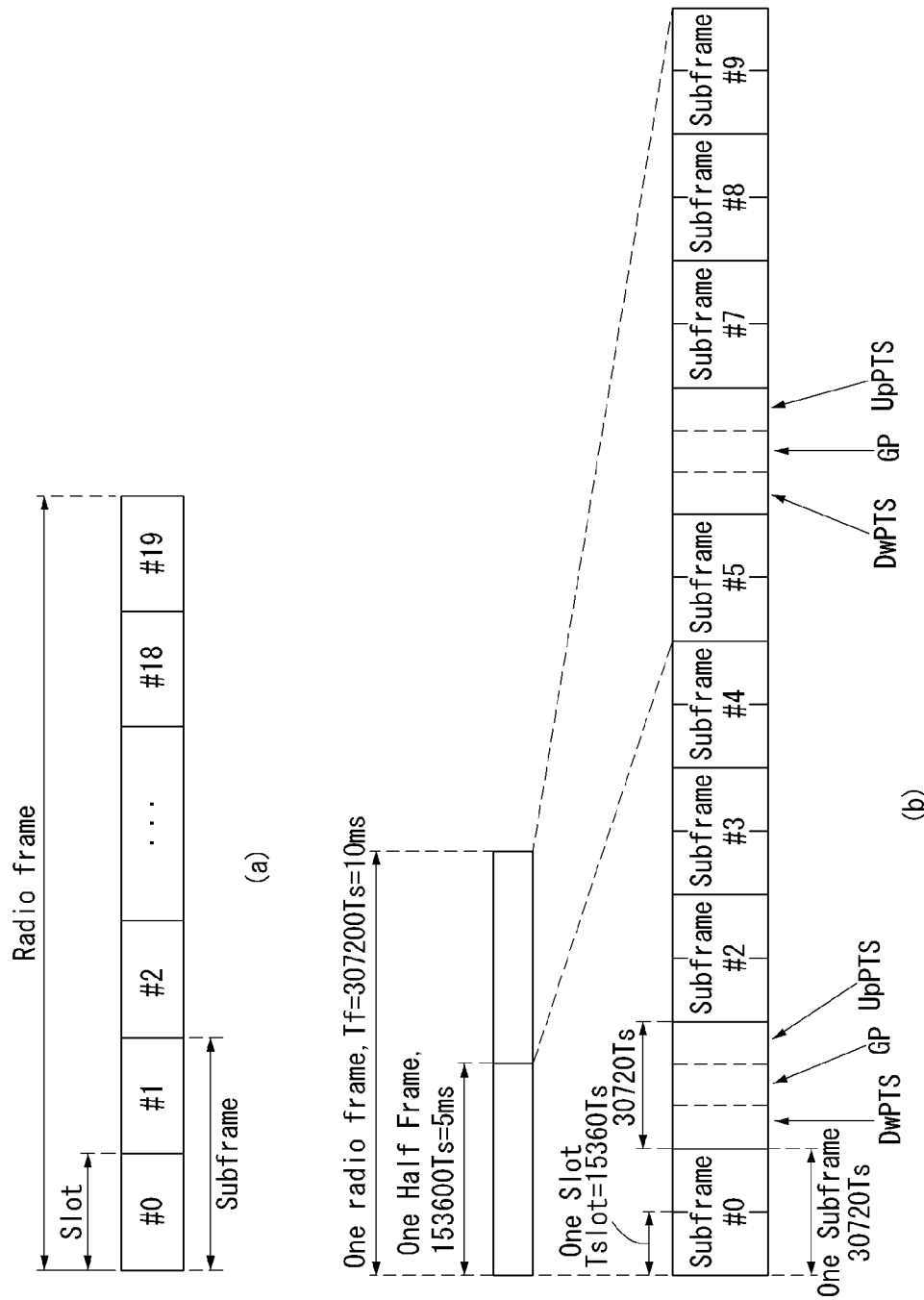
FIG. 1 illustrates the structure of a radio frame in a wireless communication system to which the disclosure may be applied.

Hereafter, preferred embodiments of the disclosure will be described in detail with reference to the accompanying drawings. A detailed description to be disclosed hereinafter together with the accompanying drawing is to describe embodiments of the disclosure and not to describe a unique embodiment for carrying out the disclosure. The detailed description below includes details in order to provide a complete understanding. However, those skilled in the art know that the disclosure can be carried out without the details.

In some cases, in order to prevent a concept of the disclosure from being ambiguous, known structures and devices may be omitted or may be illustrated in a block diagram format based on core function of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A is primarily described for clear description, but technical features of the disclosure are not limited thereto.

Overview of System

FIG. 1 illustrates the structure of a radio frame in a wireless communication system to which the disclosure may be applied.

3GPP LTE/LTE-A supports radio frame structure type 1 applicable to frequency division duplex (FDD) and radio frame structure Type 2 applicable to time division duplex (TDD).

In FIG. 1, the size of a radio frame in a time domain is represented as a multiple of a time unit of $T\_s=1/(15000*2048)$. Downlink and uplink transmissions are organized into radio frames with a duration of $T\_f=307200*T\_s=10$ ms.

FIG. 1(a) illustrates radio frame structure type 1. The radio frame structure type 1 may be applied to both full duplex FDD and half duplex FDD.

A radio frame consists of 10 subframes. One radio frame consists of 20 slots of T_slot=15360*T_s=0.5 ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 1(b) illustrates frame structure type 2.

The radio frame type 2 consists of two half-frames of 153600*T_s=5 ms length each. Each half-frame consists of five subframes of 30720*T_s=1 ms length.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS). The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

Each subframe i consists of slot 2i and slot 2i+1 of T_slot=15360*T_s=0.5 ms length each.

The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $512 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 2-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | — | — | — | — | — |
| 8 | $24144 \cdot T_s$ | — | — | — | — | — |

The structure of a radio frame according to an example of FIG. 1 is merely an example, and the number of subcarriers included in a radio frame, the number of slots included in a subframe, and the number of OFDM symbols included in a slot may be variously changed.

Figure 2:
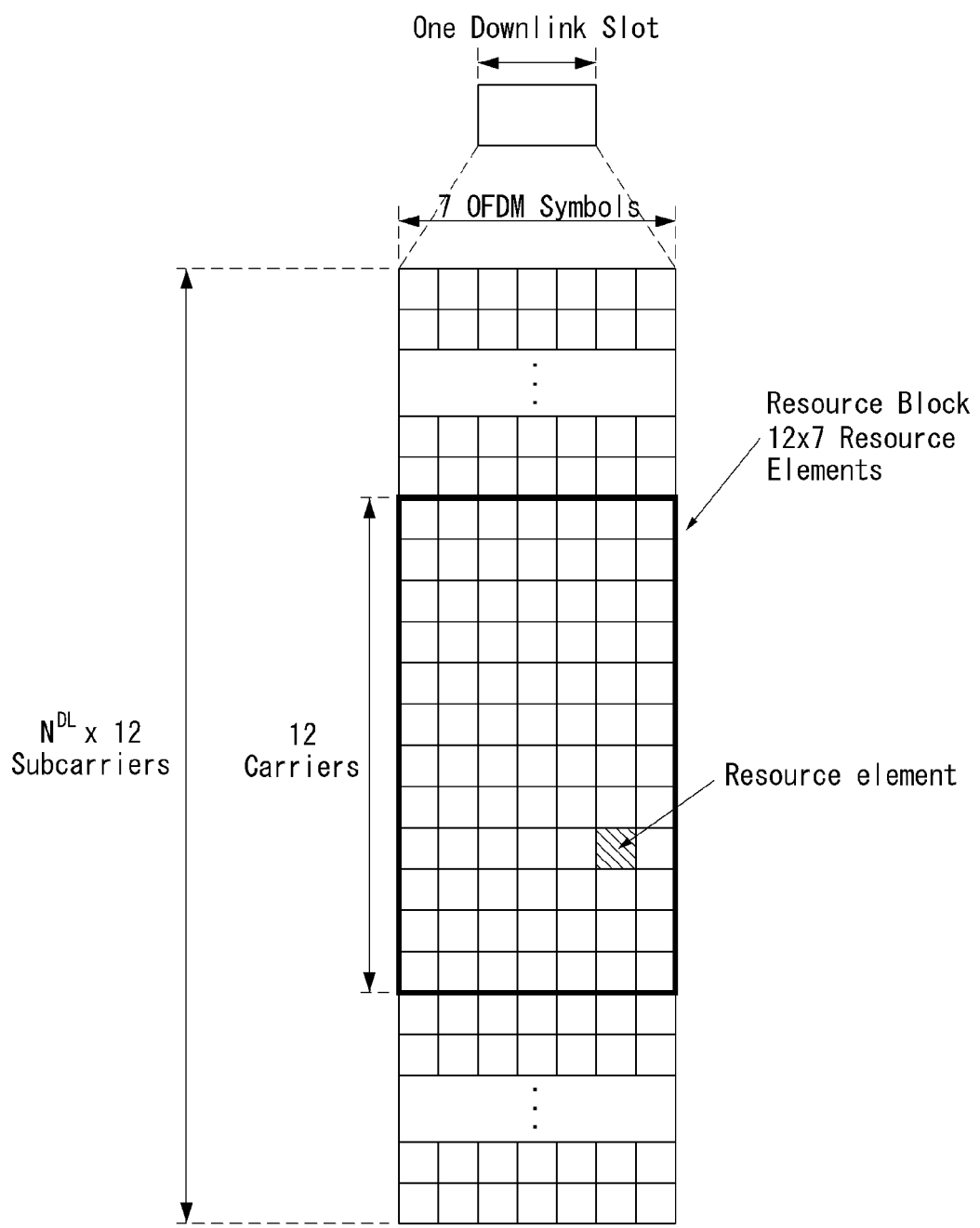
FIG. 2 illustrates a resource grid for one downlink slot in a wireless communication system to which the disclosure may be applied.

FIG. 2 is a diagram illustrating a resource grid for one downlink slot in the wireless communication system to which the disclosure may be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
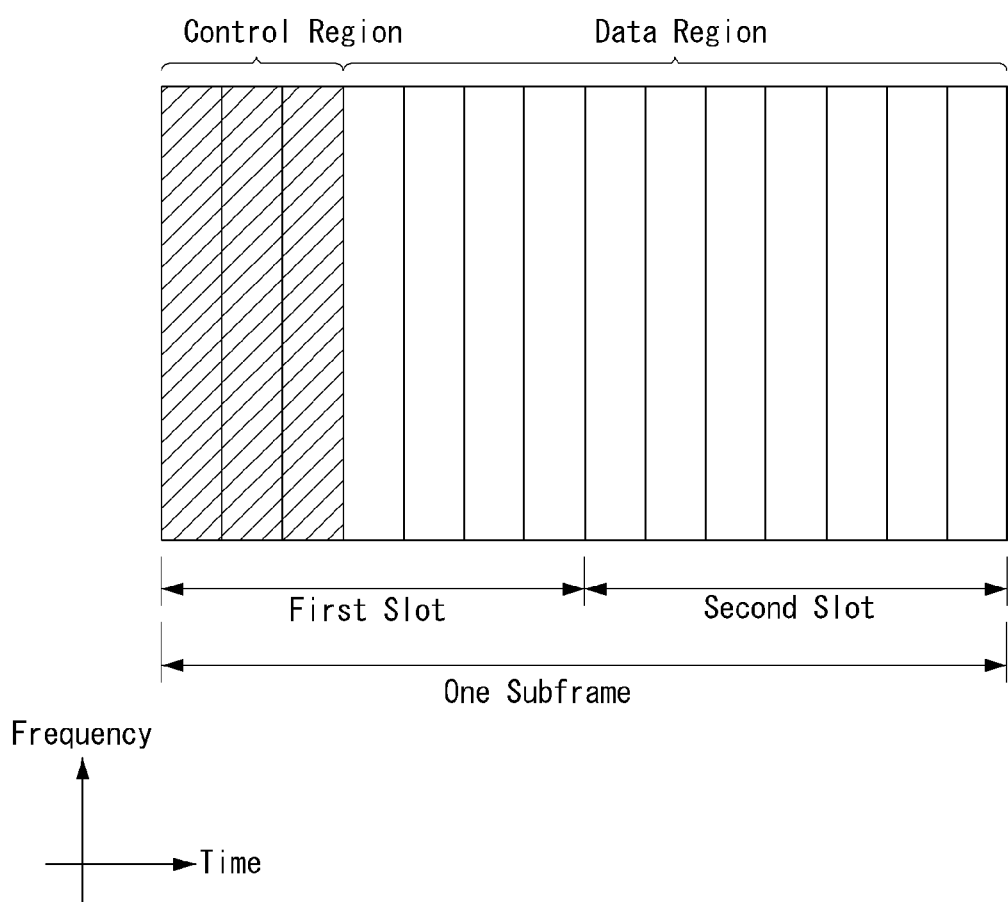
FIG. 3 illustrates the structure of a downlink subframe in a wireless communication system to which the disclosure may be applied.

FIG. 3 illustrates the structure of a downlink subframe in the wireless communication system to which the disclosure may be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a physical control format indicator channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

Figure 4:
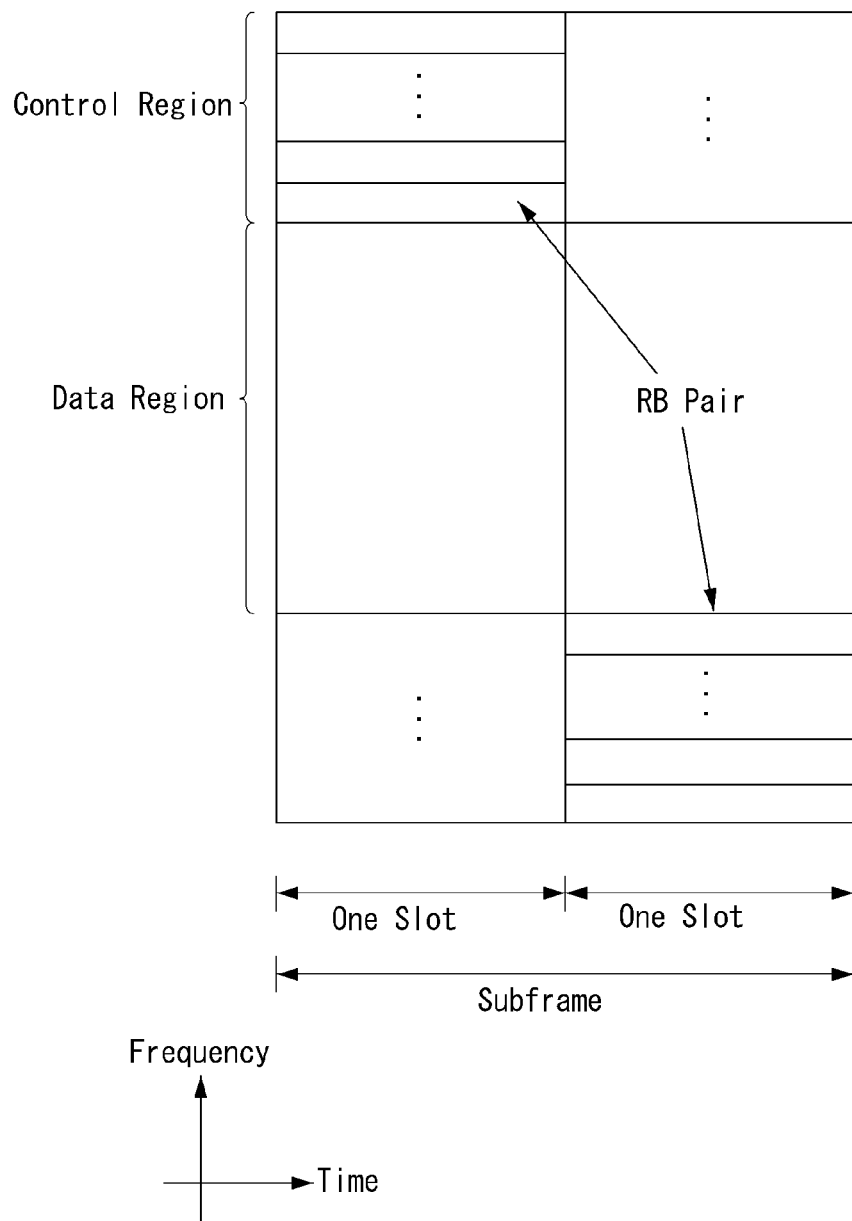
FIG. 4 illustrates the structure of an uplink subframe in a wireless communication system to which the disclosure may be applied.

FIG. 4 illustrates the structure of an uplink subframe in the wireless communication system to which the disclosure may be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

The following disclosure proposed by the disclosure can be applied to a 5G NR system (or device) as well as a LTE/LTE-A system (or device).

Communication of the 5G NR system is described below with reference to FIGS. 5 to 10.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the disclosure can be supported by standard documents disclosed in at least one of IEEE 802, 3GPP, and 3GPP2 which are the wireless access systems. That is, steps or parts in embodiments of the disclosure which are not described to clearly show the technical spirit of the disclosure can be supported by the standard documents. Further, all terms disclosed in the disclosure can be described by the standard document.

As smartphones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC) considering a service and/or a terminal sensitive to reliability and/or latency of communication is also being discussed.

Hereinafter, in the disclosure, for convenience of description, the next generation radio access technology is referred to as NR (new RAT, radio access technology), and a wireless communication system to which the NR is applied is referred to as an NR system.

Definition of NR system related terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Figure 5:
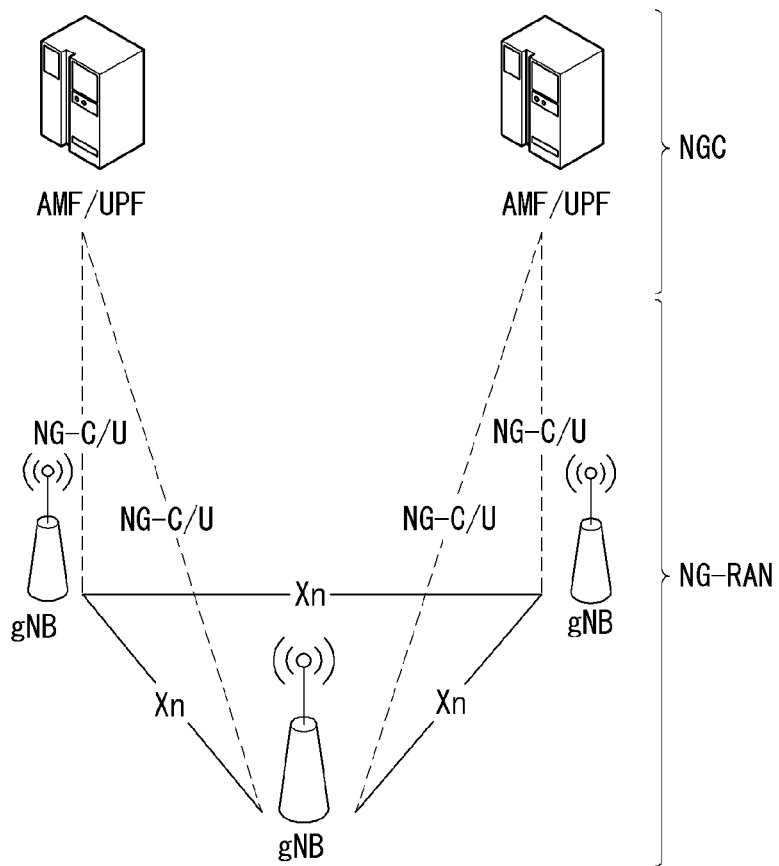
FIG. 5 illustrates an example of an overall structure of a NR system to which a method proposed in the disclosure may be applied.

FIG. 5 illustrates an example of an overall structure of a NR system to which a method proposed in the disclosure may be applied.

Referring to FIG. 5, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In a NR system, multiple numerologies can be supported. A numerology may be defined by a subcarrier spacing and a cyclic prefix (CP) overhead. Multiple subcarrier spacings can be derived by scaling a basic subcarrier spacing by an integer N (or μ). Further, although it is assumed not to use a very low subcarrier spacing at a very high carrier frequency, the numerology used can be selected independently of a frequency band.

In the NR system, various frame structures according to the multiple numerologies can be supported.

Hereinafter, an orthogonal frequency division multiplexing (OFDM) numerology and a frame structure which may be considered in the NR system will be described.

Multiple OFDM numerologies supported in the NR system may be defined as in Table 3.

TABLE 3

| μ | Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Figure 6:
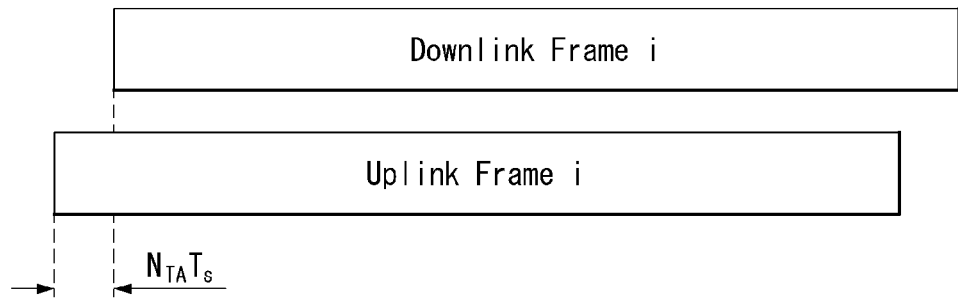
FIG. 6 illustrates a relation between an uplink frame and a downlink frame in a wireless communication system to which a method proposed in the disclosure may be applied.

In regard to a frame structure in the NR system, a size of various fields in a time domain is expressed as a multiple of a time unit of $T_s=1/(\Delta f_{max} \cdot N_f)$, where $\Delta f_{max}=480 \cdot 10^3$ and $N_f=4096$. Downlink and uplink transmissions are organized into radio frames with a duration of $T_f=(\Delta f_{max} N_f/100) \cdot T_s=10$ ms. In this case, the radio frame consists of ten subframes each having a duration of $T_{sf}=(\Delta f_{max} N_f/1000) \cdot T_s=1$ ms. In this case, there may be a set of frames in the uplink and a set of frames in the downlink. FIG. 6 illustrates a relation between an uplink frame and a downlink frame in a wireless communication system to which a method proposed in the disclosure may be applied.

As illustrated in FIG. 6, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^μ \in \{0, \ldots, N_{subframe}^{slots, μ}-1\}$ within a subframe and are numbered in increasing order of $n_{s,f}^μ \in \{0, \ldots, N_{frame}^{slots, μ}-1\}$ within a radio frame. One slot consists of consecutive OFDM symbols of $N_{symb}^μ$, and $N_{symb}^μ$ is determined depending on a numerology used and slot configuration. The start of slots $n_s^μ$ in a subframe is aligned in time with the start of OFDM symbols $n_s^μ N_{symb}^μ$ in the same subframe.

Not all UEs are able to transmit and receive at the same time, and this means that not all OFDM symbols in a downlink slot or an uplink slot are available to be used.

Table 4 represents the number $N_{symb}^{slot}$ of OFDM symbols per slot, the number $N_{slot}^{frame,μ}$ of slots per radio frame, and the number $N_{slot}^{subframe,μ}$ of slots per subframe in a normal CP. Table 5 represents the number of OFDM symbols per slot, the number of slots per radio frame, and the number of slots per subframe in an extended CP.

TABLE 4

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| μ | $N_{symb}^{slot}$ | $N_{slot}^{frame, μ}$ | $N_{slot}^{subframe, μ}$ |
|---|---|---|---|
| 2 | 12 | 40 | 4 |

Figure 7:
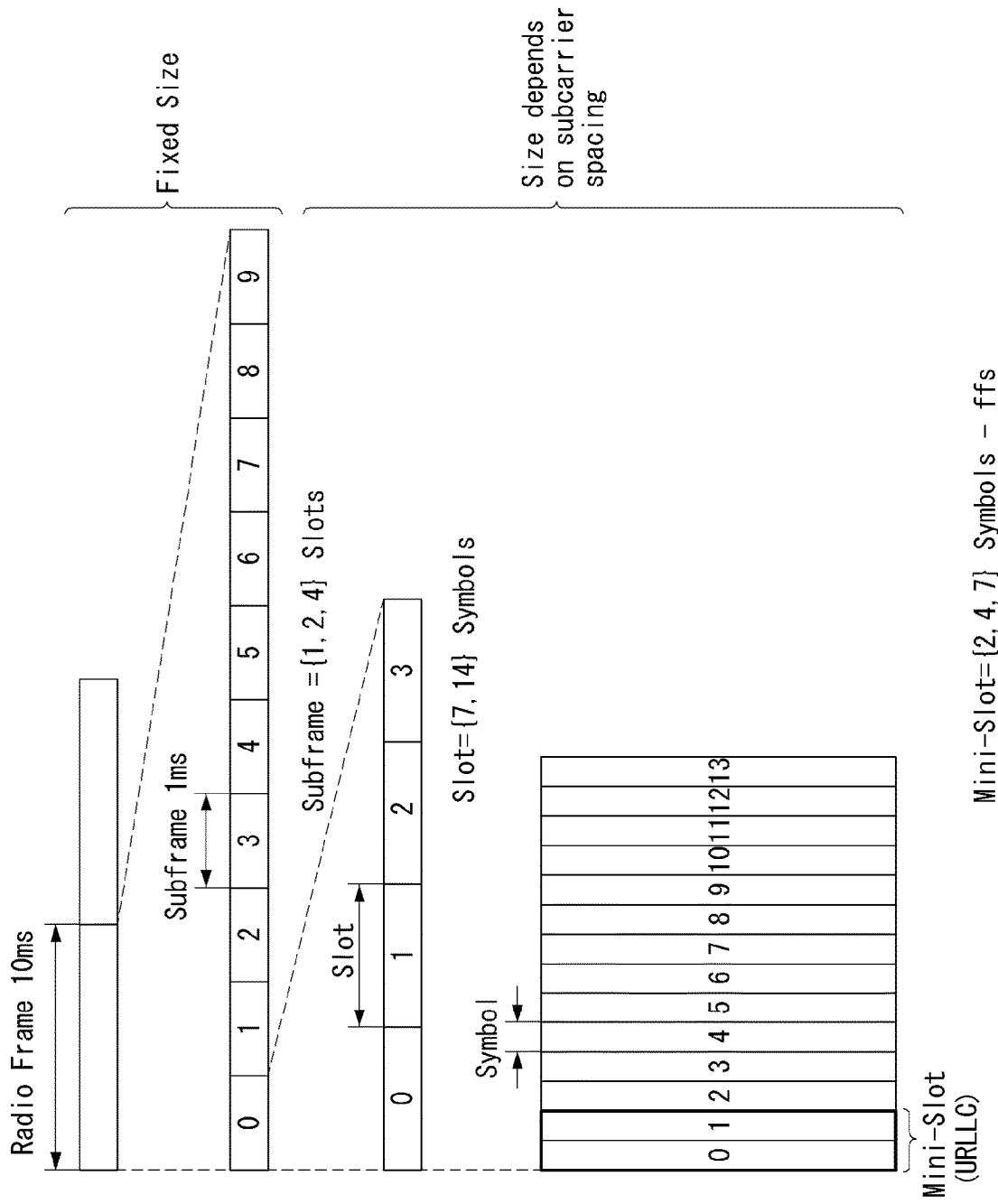
FIG. 7 illustrates an example of a frame structure in a NR system.

FIG. 7 illustrates an example of a frame structure in a NR system. FIG. 7 is merely for convenience of description and does not limit the scope of the disclosure. In Table 5, in the case of μ=2, i.e., as an example in which a subcarrier spacing (SCS) is 60 kHz, one subframe (or frame) may include four slots with reference to Table 4, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

Figure 8:
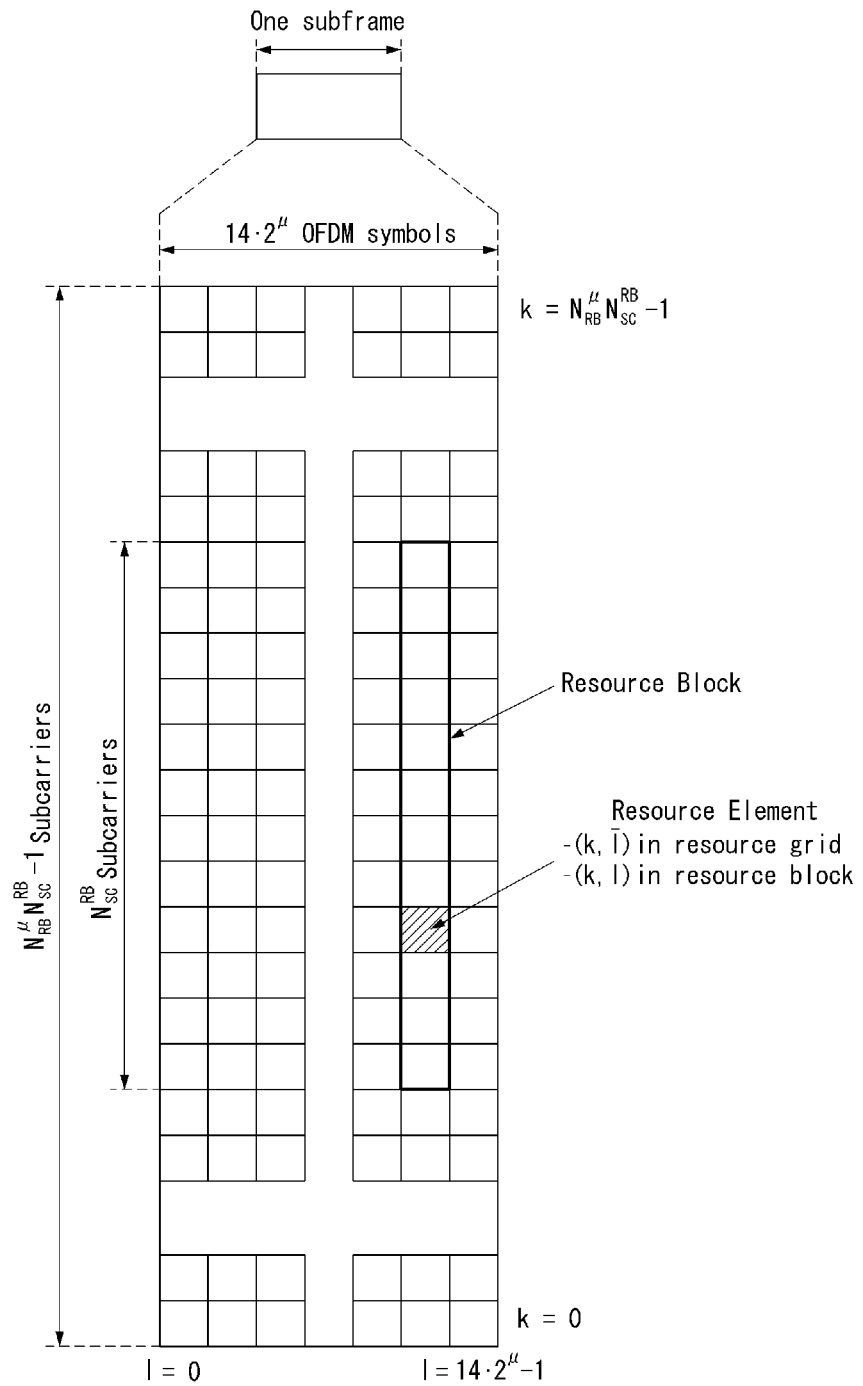
FIG. 8 illustrates an example of a resource grid supported in a wireless communication system to which a method proposed in the disclosure may be applied.

FIG. 8 illustrates an example of a resource grid supported in a wireless communication system to which a method proposed in the disclosure may be applied.

Referring to FIG. 8, a resource grid consists of $N_{RB}^μ N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^μ N_{sc}^{RB}$ subcarriers, and $2^μ N_{symb}^{(μ)}$ OFDM symbols, where $N_{RB}^μ \leq N_{RB}^{max,μ}$. $N_{RB}^{max,μ}$ denotes a maximum transmission bandwidth and may change not only between numerologies but also between uplink and downlink.

Figure 9:
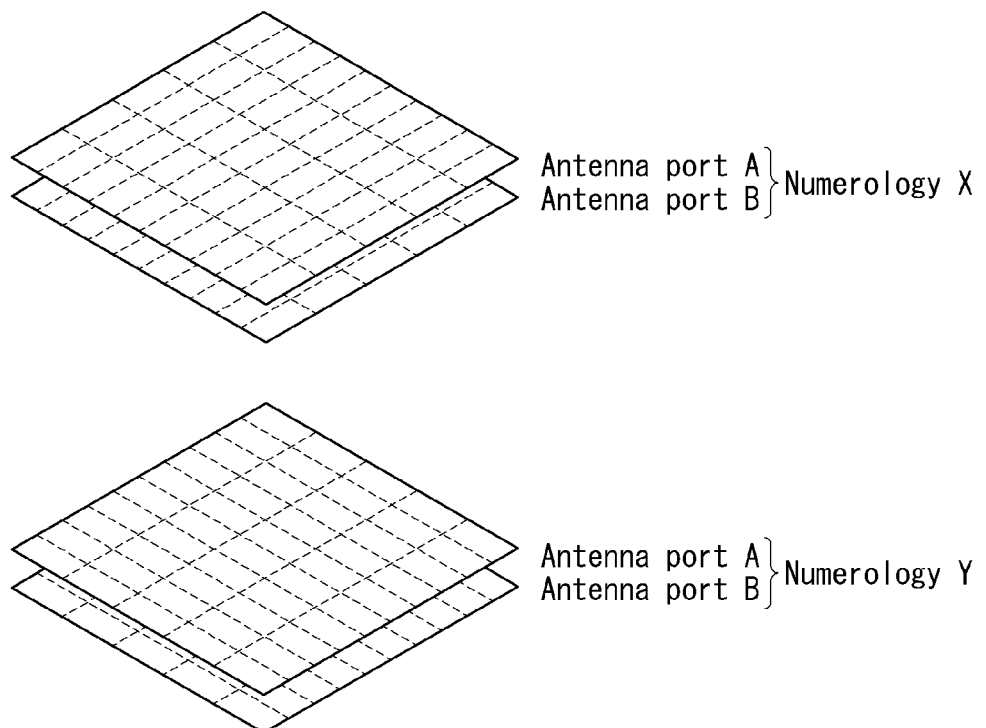
FIG. 9 illustrates examples of a resource grid per antenna port and numerology to which a method proposed in the disclosure may be applied.

In this case, as illustrated in FIG. 9, one resource grid may be configured per numerology μ and antenna port p.

FIG. 9 illustrates examples of a resource grid per antenna port and numerology to which a method proposed in the disclosure may be applied.

Each element of the resource grid for the numerology μ and the antenna port p is called a resource element and is uniquely identified by an index pair (k, l̄), where k=0, . . . , $N_{RB}^μ N_{sc}^{RB}-1$ is an index on a frequency domain, and l̄=0, . . . , $2^μ N_{symb}^{(μ)}-1$ refers to a location of a symbol in a subframe. The index pair (k, l̄) is used to refer to a resource element in a slot, where l=0, . . . , $N_{symb}^μ-1$.

The resource element (k,l̄) for the numerology μ and the antenna port p corresponds to a complex value $a_{k,l̄}^{(p,μ)}$. When there is no risk for confusion or when a specific antenna port or numerology is not specified, the indexes p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{Equation 1}$$

In this case, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{Equation 2}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

Figure 10:
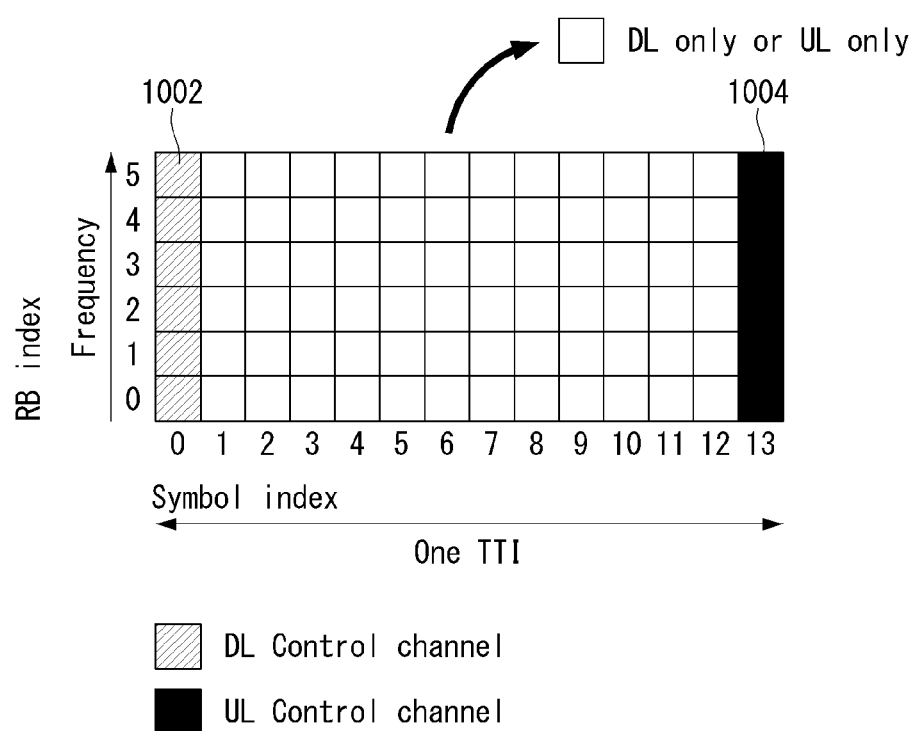
FIG. 10 illustrates an example of a self-contained structure to which a method proposed in the disclosure may be applied.

FIG. 10 illustrates an example of a self-contained structure to which a method proposed in the disclosure may be applied. FIG. 10 is merely for convenience of description and does not limit the scope of the disclosure.

Referring to FIG. 10, as in legacy LTE, it is assumed that one transmission unit (e.g., slot, subframe) consists of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

That is, uplink control information and downlink control information may be transmitted in one self-contained slot. On the other hand, in the case of data, uplink data or downlink data is transmitted in one self-contained slot.

When the structure illustrated in FIG. 10 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 10, a base station (e.g., eNodeB, eNB, gNB) and/or a user equipment (UE) (e.g., terminal) require a time gap for a process for converting a transmission mode into a reception mode or a process for converting a reception mode into a transmission mode. In regard to the time gap, if uplink transmission is performed after downlink transmission in the self-contained slot, some OFDM symbol(s) may be configured as a guard period (GP).

Physical Uplink Control Channel (PUCCH)

Uplink control information (UCI) transmitted on a PUCCH may include scheduling request (SR), HARQ ACK/NACK information, and downlink channel measurement information.

The HARQ ACK/NACK information may be produced depending on whether decoding of downlink data packet on a PDSCH is successful or not. In the existing wireless communication system, one ACK/NACK bit is transmitted in the case of single codeword downlink transmission while two ACK/NACK bits are transmitted in the case of two codeword downlink transmissions.

The channel measurement information refers to feedback information related to a multiple input multiple output (MIMO) scheme and may include a channel quality indicator (CQI), a precoding matrix index (PMI), and a rank indicator (RI). The channel measurement information may collectively be referred to as a CQI.

20 bits per subframe may be used for the CQI transmission.

The PUCCH may be modulated by using a binary phase shift keying (BPSK) scheme and a quadrature phase shift keying (QPSK) scheme. Control information for a plurality of UEs may be transmitted on the PDCCH. In case of performing code division multiplexing (CDM) to distinguish signals of the respective UEs, a length-12 constant amplitude zero autocorrelation (CAZAC) sequence is mostly used. Since the CAZAC sequence has characteristics of maintaining a predetermined amplitude in a time domain and a frequency domain, the CAZAC has properties suitable to increase coverage by reducing a peak-to-average power ratio (PAPR) or a cubic metric (CM) of the UE. In addition, the ACK/NACK information for downlink data transmission transmitted on the PDCCH is covered by using an orthogonal sequence or an orthogonal cover (OC).

Further, control information transmitted on the PUCCH may be distinguished using a cyclically shifted sequence each having a different cyclic shift (CS) value. The cyclically shifted sequence may be produced by cyclically shifting a base sequence by as much as a specific cyclic shift (CS) amount. The specific CS amount is indicated by a CS index. The number of available cyclic shifts may vary depending on the delay spread of a channel. Various kinds of sequences may be used as the base sequence, and the CAZAC sequence described above is an example.

An amount of control information that the UE can transmit in one subframe may be determined depending on the number of SC-FDMA symbols (i.e., SC-FDMA symbols except SC-FDMA symbols used for reference signal (RS) transmission for coherent detection of the PUCCH), that can be used in the transmission of the control information.

In the 3GPP LTE system, the PUCCH is defined as a total of seven different formats depending on transmitted control information, a modulation scheme, an amount of control information, etc., and attributes of uplink control information (UCI) transmitted according to each PUCCH format may be summarized as in the following Table 6.

TABLE 6

| PUCCH Format | Uplink Control Information(UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |

TABLE 6-continued

| PUCCH Format | Uplink Control Information(UCI) |
|---|---|
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for single transmission of SR. In case of single transmission of SR, an unmodulated waveform is applied, which will be described below in detail. PUCCH format 1a or 1b is used for transmission of HARQ ACK/NACK. In case of single transmission of HARQ ACK/NACK in a random subframe, PUCCH format 1a or 1b may be used. Alternatively, the HARQ ACK/NACK and the SR may be transmitted in the same subframe using the PUCCH format 1a or 1b.

PUCCH format 2 is used for transmission of a CQI, and PUCCH format 2a or 2b is used for transmission of the CQI and the HARQ ACK/NACK.

In case of an extended CP, the PUCCH format 2 may also be used for transmission of the CQI and the HARQ ACK/NACK.

Figure 11:
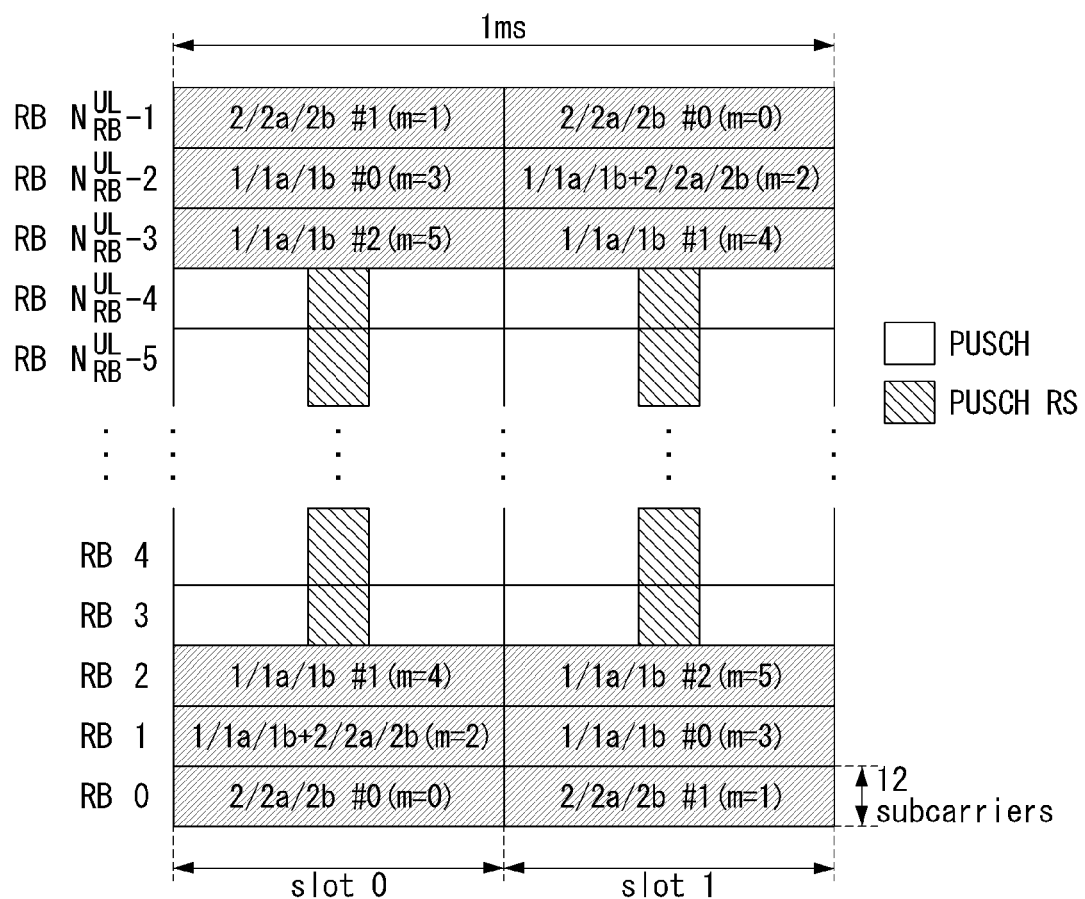
FIG. 11 illustrates an example in which physical uplink control channel (PUCCH) formats are mapped to PUCCH regions of uplink physical resource blocks in a wireless communication system to which the disclosure may be applied.

FIG. 11 illustrates an example in which PUCCH formats are mapped to PUCCH regions of uplink physical resource blocks in a wireless communication system to which the disclosure may be applied.

In FIG. 11, $N_{RB}^{UL}$ represents the number of resource blocks in the uplink, and $0, 1, \ldots, N_{RB}^{UL}-1$ refers to No. of s physical resource block. Basically, the PUCCH is mapped to both edges of an uplink frequency block. As illustrated in FIG. 11, the PUCCH format 2/2a/2b is mapped to a PUCCH region marked by m=0, 1, which may represent that the PUCCH format 2/2a/2b is mapped to resource blocks located at band edges. In addition, the PUCCH format 2/2a/2b and the PUCCH format 1/1a/1b are interchangeably mapped to the PUCCH region marked by m=2. Next, the PUCCH format 1/1a/1b may be mapped to a PUCCH region marked by m=3, 4, 5. The number $N_{RB}^{(2)}$ of PUCCH RBs available for use by the PUCCH format 2/2a/2b may be indicated to the UEs in a cell by broadcasting signaling.

The PUCCH format 2/2a/2b is described. The PUCCH format 2/2a/2b is a control channel used to transmit channel measurement feedbacks CQI, PMI, and RI.

A periodicity and a frequency unit (or a frequency resolution) to be used to report the channel measurement feedback (hereinafter, collectively referred to as CQI information) may be controlled by the base station. Periodic CQI reporting and aperiodic CQI reporting in a time domain can be reported. The PUCCH format 2 may be used for the periodic CQI reporting only, and the PUSCH may be used for the aperiodic CQI reporting. In case of the aperiodic CQI reporting, the base station may instruct the UE to send an individual CQI report embedded into a resource which is scheduled for uplink data transmission.

Figure 12:
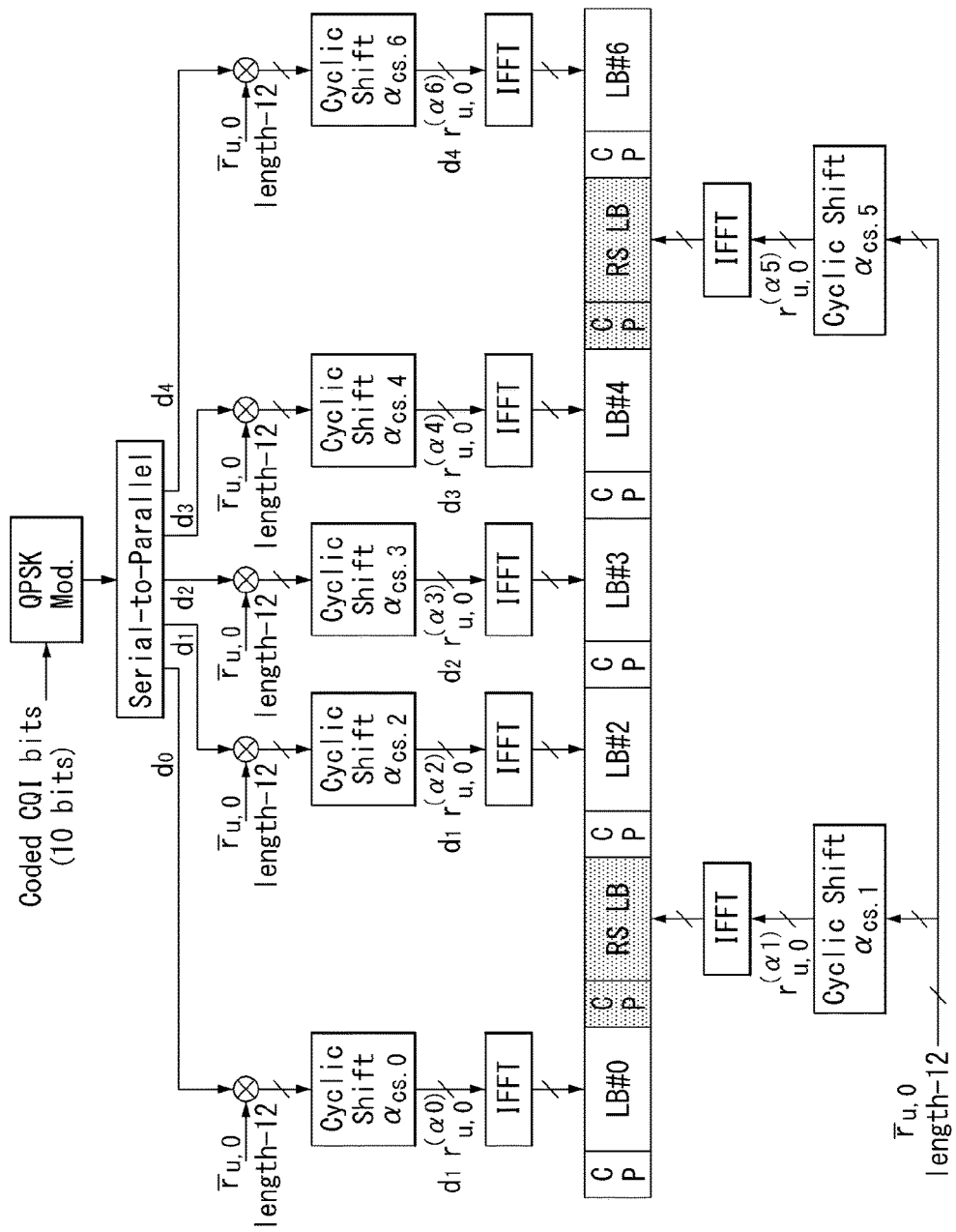
FIG. 12 illustrates the structure of a channel quality indicator (CQI) channel in the case of a normal cyclic prefix (CP) in a wireless communication system to which the disclosure may be applied.

FIG. 12 illustrates the structure of CQI channel in the case of a normal CP in a wireless communication system to which the disclosure may be applied.

Among SC-FDMA symbols 0 to 6 of one slot, SC-FDMA symbols 1 and 5 (second and sixth symbols) may be used for transmission of demodulation reference signal (DMRS), and the CQI information may be transmitted in the remaining SC-FDMA symbols. In case of the extended CP, one SC-FDMA symbol (SC-FDMA symbol 3) is used for the DMRS transmission.

In the PUCCH format 2/2a/2b, the modulation by the CAZAC sequence is supported, and a QPSK modulated symbol is multiplied by the length-12 CAZAC sequence. A cyclic shift (CS) of the sequence is changed between symbols and slots. An orthogonal covering is used for the DMRS.

The reference signal (DMRS) is carried on two SC-FDMA symbols which are separated from each other at an interval of three SC-FDMA symbols among seven SC-FDMA symbols included in one slot, and the CQI information is carried on the remaining five SC-FDMA symbols. The use of two RSs in one slot is to support a high speed UE. Further, the respective UEs are distinguished using a cyclic shift (CS) sequence. CQI information symbols are modulated and transmitted to all the SC-FDMA symbols, and the SC-FDMA symbol is composed of one sequence. That is, the UE modulates the CQI and transmits the modulated CQI to each sequence.

The number of symbols which can be transmitted in one TTI is 10, and the modulation of the CQI information is also determined up to the QPSK. Since a 2-bit CQI value can be carried in the case of using the QPSK mapping for the SC-FDMA symbol, a 10-bit CQI value can be carried on one slot. Thus, a CQI value of maximum 20 bits can be carried in one subframe. A frequency domain spreading code is used to spread the CQI information in a frequency domain.

As the frequency domain spreading code, length-12 CAZAC sequence (e.g., ZC sequence) may be used. Each control channel may be distinguished by applying the CAZAC sequence having a different cyclic shift value. An IFFT is performed on frequency domain spreading CQI information.

The 12 equally-spaced cyclic shifts may allow 12 different UEs to be orthogonally multiplexed on the same PUCCH RB. In case of a normal CP, a DMRS sequence on the SC-FDMA symbol 1 and 5 (on the SC-FDMA symbol 3 in the case of an extended CP) is similar to a CQI signal sequence on the frequency domain, but the modulation like the CQI information is not applied.

The UE may be semi-statically configured by higher layer signaling to report periodically different CQI, PMI, and RI types on PUCCH resources indicated as PUCCH resource indexes ($n_{PUCCH}^{(1,\tilde{p})}$, $n_{PUCCH}^{(2,\tilde{p})}$, $n_{PUCCH}^{(3,\tilde{p})}$). In this case, the PUCCH resource index ($n_{PUCCH}^{(2,\tilde{p})}$) is information indicating a PUCCH region used for the PUCCH format 2/2a/2b transmission and a cyclic shift (CS) value to be used.

PUCCH Channel Structure

PUCCH formats 1a and 1b are described.

In the PUCCH format 1a/1b, a symbol modulated using a BPSK or QPSK modulation scheme is multiplied by length-12 CAZAC sequence. For example, the result of multiplying length-N CAZAC sequence r(n) (where n=0, 1, 2, ..., N−1) by a modulation symbol d(0) is y(0), y(1), y(2), ..., y(N−1). The symbols y(0), y(1), y(2), ..., y(N−1) may be referred to as a block of symbols. After the CAZAC sequence is multiplied by the modulation symbol, the block-wise spreading using an orthogonal sequence is applied.

A length-4 Hadamard sequence is used for normal ACK/NACK information, and a length-3 discrete Fourier transform (DFT) sequence is used for shortened ACK/NACK information and a reference signal.

A length-2 Hadamard sequence is used for the reference signal in the case of an extended CP.

Figure 13:
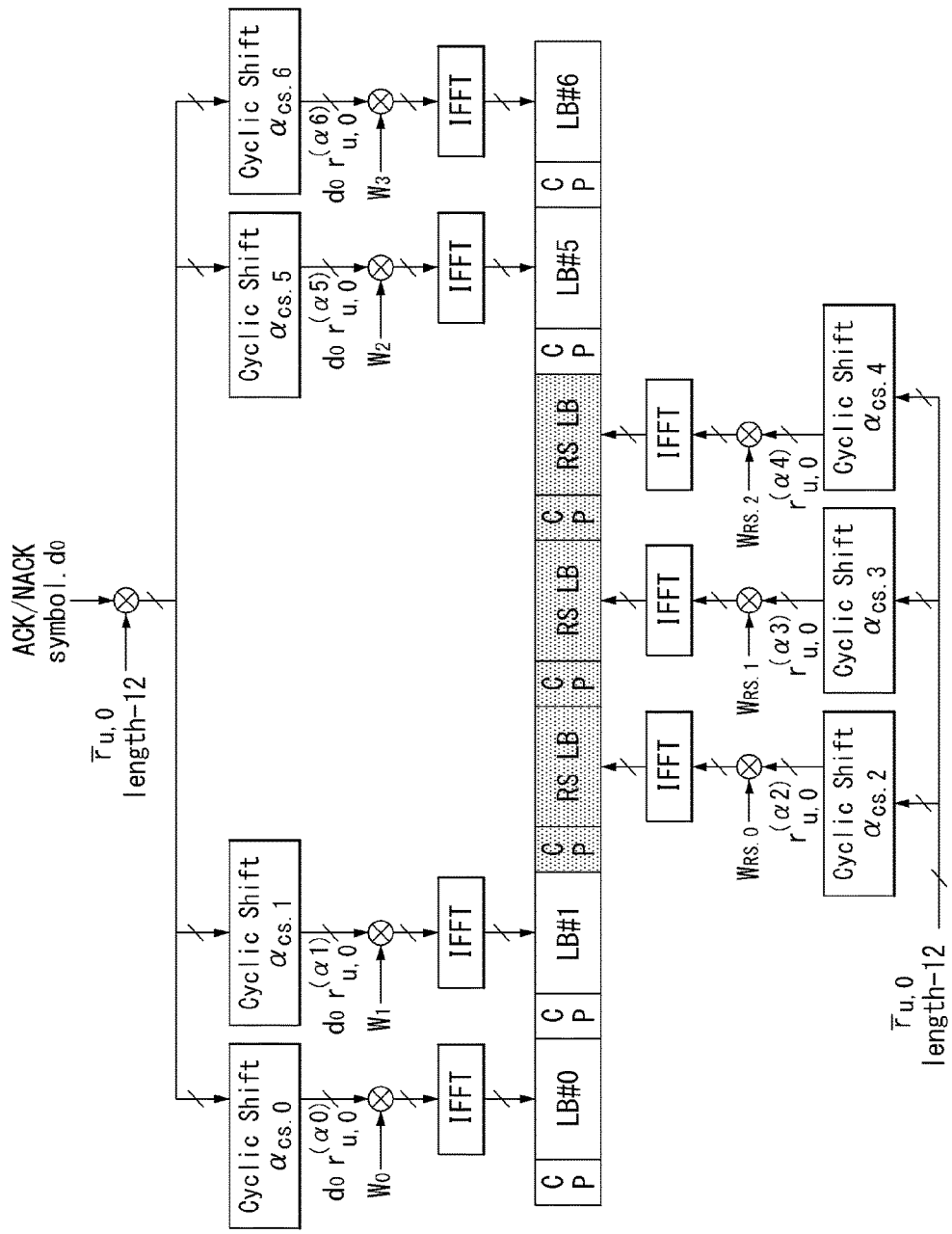
FIG. 13 illustrates the structure of ACK/NACK channel in the case of a normal CP in a wireless communication system to which the disclosure may be applied.

FIG. 13 illustrates the structure of ACK/NACK channel in the case of a normal CP in a wireless communication system to which the disclosure may be applied.

More specifically, FIG. 13 illustrates an example of a PUCCH channel structure for HARQ ACK/NACK transmission without CQI.

A reference signal (RS) is carried on three consecutive SC-FDMA symbols in the middle of seven SC-FDMA symbols included in one slot, and an ACK/NACK signal is carried on the remaining four SC-FDMA symbols.

In case of an extended CP, the RS may be carried on two consecutive symbols in the middle. The number and location of symbols used for the RS may vary depending on a control channel, and the number and location of symbols used for the ACK/NACK signal related may be changed accordingly.

Both 1-bit and 2-bit acknowledgement information (in a state of not being scrambled) may be expressed as a single HARQ ACK/NACK modulation symbol using the BPSK and QPSK modulation schemes, respectively. Positive acknowledgement (ACK) may be encoded as '1', and negative ACK (HACK) may be encoded as '0'.

When a control signal is transmitted in an allocated bandwidth, two-dimensional spreading is applied to increase a multiplexing capacity. That is, frequency domain spreading and time domain spreading are simultaneously applied to increase the number of UEs or the number of control channels that can be multiplexed.

In order to spread an ACK/NACK signal in the frequency domain, a frequency domain sequence is used as a base sequence. As the frequency domain sequence, a Zadoff-Chu (ZC) sequence which is a kind of CAZAC sequence may be used. For example, multiplexing of different UEs or different control channels can be applied by applying different cyclic shifts (CS) to the ZC sequence which is the base sequence. The number of CS resources supported in SC-FDMA symbols for PUCCH RBs for the HARQ ACK/NACK transmission is configured by a cell-specific higher layer signaling parameter $\Delta_{shift}^{PUCCH}$.

The frequency domain spreading ACK/NACK signal is spread in a time domain using an orthogonal spreading code. A Walsh-Hadamard sequence or a DFT sequence may be used as the orthogonal spreading code. For example, the ACK/NACK signal may be spread using length-4 orthogonal sequences (w0, w1, w2, w3) for four symbols. An RS is also spread through length-3 or length-2 orthogonal sequence. This is referred to as orthogonal covering (OC).

As described above, multiple UEs may be multiplexed in a code division multiplexing (CDM) method using CS resources in the frequency domain and OC resources in the time domain. That is, ACK/NACK information and a RS of a large number of UEs may be multiplexed on the same PUCCH RB.

As to the time domain spreading CDM, the number of spreading codes supported for the ACK/NACK information is limited by the number of RS symbols. That is, since the number of SC-FDMA symbols for RS transmission is less than the number of SC-FDMA symbols for ACK/NACK information transmission, a multiplexing capacity of the RS is less than a multiplexing capacity of the ACK/NACK information.

For example, in the case of the normal CP, the ACK/NACK information may be transmitted on four symbols, and not four but three orthogonal spreading codes may be used for the ACK/NACK information. The reason for this is that the number of RS transmission symbols is limited to three, and three orthogonal spreading codes only may be used for the RS.

If three symbols in one slot are used for the RS transmission and four symbols are used for the ACK/NACK information transmission in a subframe of the normal CP, for example, if six cyclic shifts (CSs) in the frequency domain and three orthogonal covering (OC) resources in the time domain can be used, HARQ acknowledgement from a total of 18 different UEs may be multiplexed within one PUCCH RB. If two symbols in one slot are used for the RS transmission and four symbols are used for the ACK/NACK information transmission in a subframe of the extended CP, for example, if six cyclic shifts (CSs) in the frequency domain and two orthogonal covering (OC) resources in the time domain can be used, HARQ acknowledgement from a total of 12 different UEs may be multiplexed in one PUCCH RB.

Next, the PUCCH format 1 is described. A scheduling request (SR) is transmitted in such a manner that the UE is requested to be scheduled or is not request. A SR channel reuses an ACK/NACK channel structure in the PUCCH format 1a/1b, and is configured in an on-off keying (OOK) method based on an ACK/NACK channel design. In the SR channel, a reference signal is not transmitted. Thus, length-7 sequence is used in the normal CP, and length-6 sequence is used in the extended CP. Different cyclic shifts or orthogonal covers may be allocated for the SR and the ACK/NACK. That is, the UE transmits HARQ ACK/NACK on resources allocated for the SR for the purpose of positive SR transmission. The UE transmits HARQ ACK/NACK on resources allocated for the ACK/NACK for the purpose of negative SR transmission.

Next, an enhanced-PUCCH (e-PUCCH) format is described. The e-PUCCH format may correspond to PUCCH format 3 of the LTE-A system. A block spreading scheme may be applied to the ACK/NACK transmission using the PUCCH format 3.

PUCCH Piggybacking in Rel-8 LTE

Figure 14:
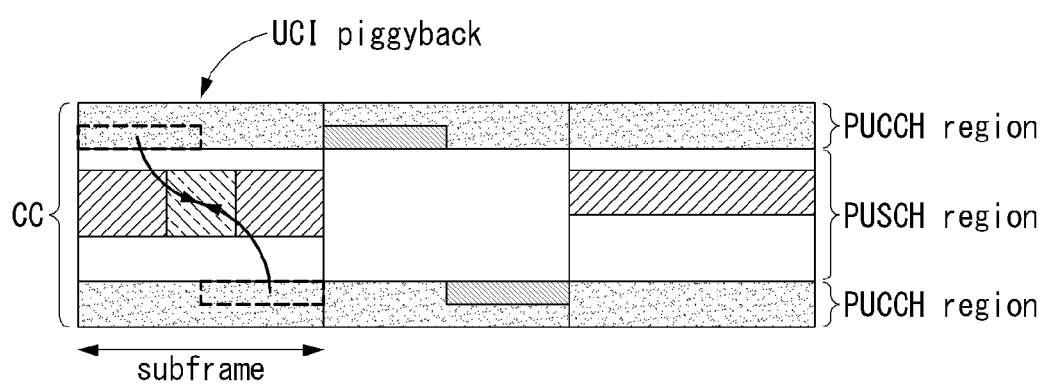
FIG. 14 illustrates an example of transport channel processing of an uplink shared channel (UL-SCH) in a wireless communication system to which the disclosure may be applied.

FIG. 14 illustrates an example of transport channel processing of an UL-SCH in a wireless communication system to which the disclosure may be applied.

In the 3GPP LTE system (=E-UTRA, Rel. 8), in the case of the UL, for efficient utilization of a power amplifier of a terminal, peak-to-average power ratio (PAPR) characteristics or cubic metric (CM) characteristics that affect a performance of the power amplifier are configured so that good single carrier transmission is maintained. That is, in the existing LTE system, the good single carrier characteristics can be maintained by maintaining single carrier characteristics of data to be transmitted through DFT-precoding in the case of the PUSCH transmission, and transmitting information carried on a sequence with the single carrier characteristic in the case of the PUCCH transmission. However, when DFT-precoded data is non-consecutively allocated to a frequency axis or the PUSCH and the PUCCH are simultaneously transmitted, the single carrier characteristics are degraded. Thus, as illustrated in FIG. 8, when the PUSCH is transmitted in the same subframe as the PUCCH transmission, uplink control information (UCI) to be transmitted to the PUCCH for the purpose of maintaining the single carrier characteristics is transmitted (piggyback) together with the data via the PUSCH.

As described above, because the PUCCH and the PUSCH cannot be simultaneously transmitted in the existing LTE terminal, the existing LTE terminal uses a method that multiplexes uplink control information (UCI) (CQI/PMI, HARQ-ACK, RI) to the PUSCH region in a subframe in which the PUSCH is transmitted.

For example, when a channel quality indicator (CQI) and/or a precoding matrix indicator (PMI) needs to be transmitted in a subframe allocated to transmit the PUSCH, UL-SCH data and the CQI/PMI are multiplexed before DFT-spreading to transmit both control information and data. In this case, the UL-SCH data performs rate-matching considering CQI/PMI resources. Further, a scheme is used, in which control information such as HARQ ACK and RI punctures the UL-SCH data and is multiplexed to the PUSCH region.

Figure 15:
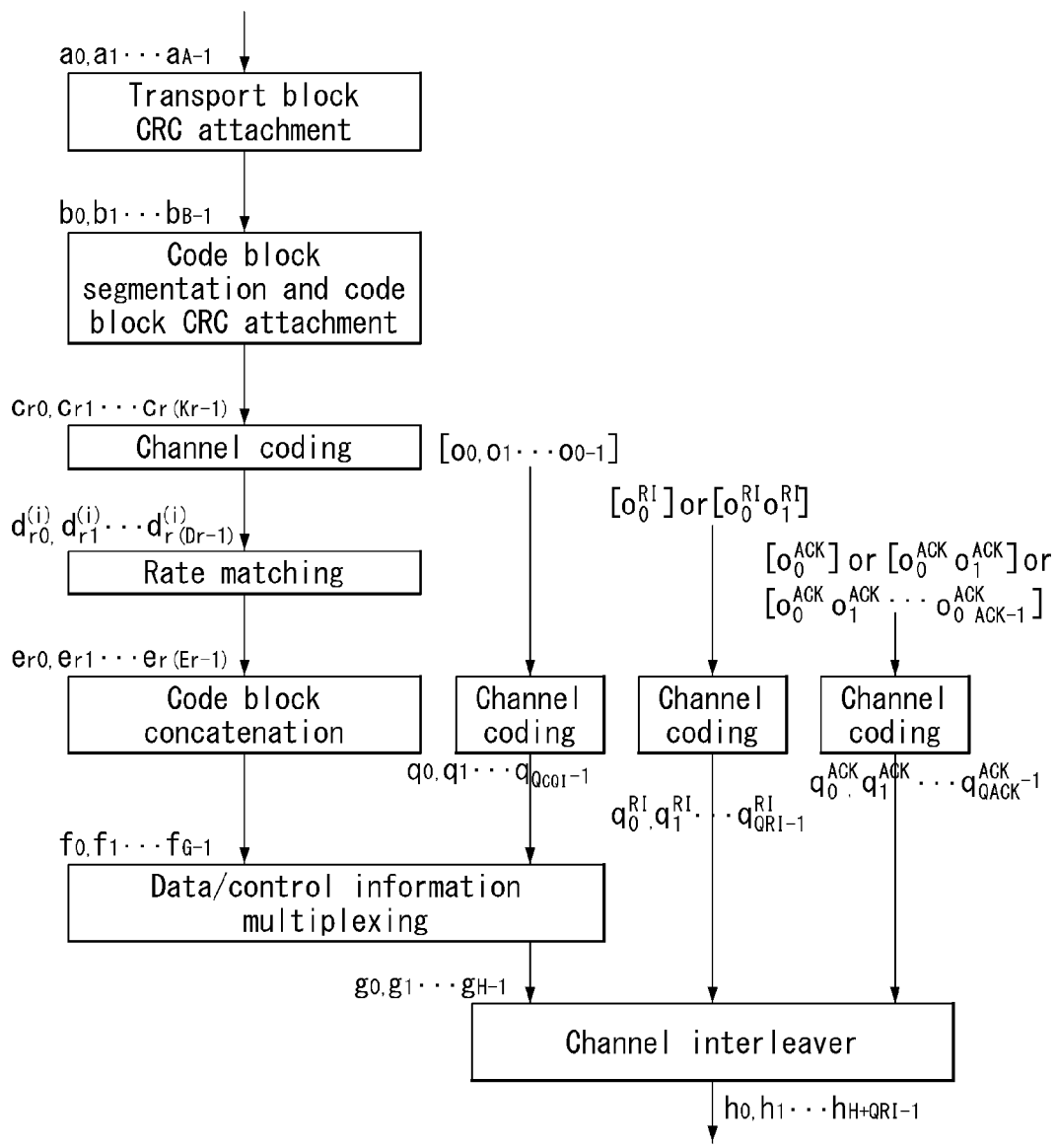
FIG. 15 illustrates an example of the signal processing of an uplink shared channel that is a transport channel in a wireless communication system to which the disclosure may be applied.

FIG. 15 illustrates an example of the signal processing of an uplink shared channel that is a transport channel in a wireless communication system to which the disclosure may be applied.

Hereinafter, signal processing of an uplink shared channel (hereinafter, referred to as "UL-SCH") may be applied to one or more transport channels or control information types.

Referring to FIG. 15, the UL-SCH transfers data to a coding unit in the form of a transport block (TB) once every a transmission time interval (TTI).

CRC parity bits $p_0, p_1, p_2, p_3, \ldots, p_{L-1}$ are attached to bits $a_0, a_1, a_2, a_3, \ldots, a_{L-1}$ of a transport block transferred from the upper layer. In this instance, A denotes a size of the transport block, and L denotes the number of parity bits. Input bits, to which the CRC is attached, are denoted by $b_0, b_1, b_2, b_3, \ldots, b_{B-1}$. In this instance, B denotes the number of bits of the transport block including the CRC.

$b_0, b_1, b_2, b_3, \ldots, b_{B-1}$ are segmented into multiple code blocks (CBs) according to the size of the TB, and the CRC is attached to the multiple segmented CBs. Bits after the code block segmentation and the CRC attachment are denoted by $c_{r0}, c_{r1}, c_{r2}, c_{r3}, \ldots, c_{r(K_r-1)}$. In this case, r represents No. (r=0, ..., C-1) of the code block, and Kr represents the number of bits depending on the code block r. Further, C represents the total number of code blocks.

Subsequently, channel coding is performed. Output bits after the channel coding are denoted by $d_{r0}^{(i)}, d_{r1}^{(i)}, d_{r2}^{(i)}, d_{r3}^{(i)}, \ldots, d_{r(D_r-1)}^{(i)}$. In this instance, i denotes a coded stream index and may have a value of 0, 1, or 2. Dr denotes the number of bits of an i-th coded stream for a code block r. r denotes a code block number (r=0, ..., C-1), and C represents the total number of code blocks. Each code block may be coded by turbo coding.

Subsequently, rate matching is performed. Bits after the rate matching are denoted by $e_{r0}, e_{r1}, e_{r2}, e_{r3}, \ldots, e_{r(E_r-1)}$. In this case, r represents the code block number (r=0, ..., C-1), and C represents the total number of code blocks. Er represents the number of rate-matched bits of a r-th code block.

Subsequently, concatenation between the code blocks is performed again. Bits after the concatenation of the code blocks is performed are denoted by $f_0, f_1, f_2, f_3, \ldots, f_{G-1}$. In this instance, G represents the total number of bits coded for transmission, and when the control information is multiplexed with the UL-SCH, the number of bits used for the transmission of the control information is not included.

When the control information is transmitted on the PUSCH, channel coding of CQI/PMI, RI, and ACK/NACK which are the control information is independently performed. Because different coded symbols are allocated for the transmission of each control information, each control information has a different coding rate.

In time division duplex (TDD), an ACK/NACK feedback mode supports two modes of ACK/NACK bundling and ACK/NACK multiplexing by higher layer configuration. ACK/NACK information bit for the ACK/NACK bundling consists of 1 bit or 2 bits, and ACK/NACK information bit for the ACK/NACK multiplexing consists of between 1 bit and 4 bits.

After the concatenation between the code blocks, coded bits $f_0, f_1, f_2, f_3, \ldots, f_{G-1}$ of the UL-SCH data and coded bits $q_0, q_1, q_2, q_3, \ldots, q_{N_L \cdot Q_{CQI}-1}$ of the CQI/PMI are multiplexed. The result of multiplexing the data and the CQI/PMI is denoted by $g_0, g_1, g_2, g_3, \ldots, g_{H'-1}$. In this instance, $g_i$ (i=0, ..., H'-1) represents a column vector with a length of $(Q_m \cdot N_L, H=(G+N_L \cdot Q_{CQI})$, and $H'=H/(N_L \cdot Q_m)$. $N_L$ represents the number of layers mapped to a UL-SCH transport block, and H represents the total number of coded bits allocated, for the UL-SCH data and the CQI/PMI information, to $N_L$ transport layers to which the transport block is mapped.

Subsequently, multiplexed data and CQI/PMI, separately channel-coded RI, and ACK/NACK are channel-interleaved to generate an output signal.

PDCCH Assignment Procedure

A plurality of PDCCHs may be transmitted within one subframe. That is, a control region of one subframe consists of a plurality of CCEs having indexes 0 to $N_{CCE,k}-1$, where $N_{CCE,k}$ denotes the total number of CCEs in a control region of a k-th subframe. The UE monitors a plurality of PDCCHs in every subframe. In this case, the monitoring means that the UE attempts the decoding of each PDCCH depending on a monitored PDCCH format. The base station does not provide the UE with information about where the corresponding PDCCH is in a control region allocated in a subframe. Since the UE cannot know which position its own PDCCH is transmitted at which CCE aggregation level or DCI format in order to receive a control channel transmitted by the base station, the UE monitors a set of PDCCH candidates in the subframe and searches its own PDCCH. This is called blind decoding/detection (BD). The blind decoding refers to a method, by the UE, for de-masking its own UE identifier (UE ID) from a CRC part and then checking whether a corresponding PDCCH is its own control channel by reviewing a CRC error.

In an active mode, the UE monitors a PDCCH of each subframe in order to receive data transmitted to the UE. In a DRX mode, the UE wakes up in a monitoring interval of each DRX period and monitors a PDCCH in a subframe corresponding to the monitoring interval. A subframe in which the monitoring of the PDCCH is performed is called a non-DRX subframe.

The UE shall perform the blind decoding on all of CCEs present in a control region of the non-DRX subframe in order to receive the PDCCH transmitted to the UE. Since the UE does not know which PDCCH format will be transmitted, the UE shall decode all of PDCCHs at a possible CCE aggregation level until the blind decoding of the PDCCHs is successful within each non-DRX subframe. Since the UE does not know how many CCEs are used for the PDCCH for the UE, the UE shall attempt detection at all the possible CCE aggregation levels until the blind decoding of the PDCCH is successful. That is, the UE performs the blind decoding per CCE aggregation level. That is, the UE first attempts decoding by setting a CCE aggregation level unit to 1. If all the decoding fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts the blind decoding on a total of four of C-RNTI, P-RNTI, SI-RNTI, and RA-RNTI. The UE attempts blind decoding on all the DCI formats that need to be monitored.

As described above, if the UE performs blind decoding on all the possible RNTIs and all the DCI formats, that need to be monitored, per each of all the CCE aggregation levels, the number of detection attempts excessively increases. Therefore, in the LTE system, a search space (SS) concept is defined for the blind decoding of the UE. The search space means a set of PDCCH candidates for monitoring, and may have a different size depending on each PDCCH format.

The search space may include a common search space (CSS) and a UE-specific/dedicated search space (USS). In the case of the common search space, all the UEs may be aware of the size of the common search space, but the UE-specific search space may be individually configured to each UE. Thus, the UE must monitor both the UE-specific search space and the common search space in order to decode the PDCCH, and thus performs blind decoding (BD) up to 44 times in one subframe. This does not include blind decoding performed based on a different CRC value (e.g., C-RNTI, P-RNTI, SI-RNTI, RA-RNTI).

A case where the base station cannot secure CCE resources for transmitting a PDCCH to all the UEs which intend to transmit the PDCCH within a given subframe due to a small search space may occur. The reason for this is that resources left over after a CCE location is allocated may not be included in a search space of a specific UE. In order to minimize such a barrier that may continue even in a next subframe, a UE-specific hopping sequence may be applied to the point at which the UE-specific search space starts.

Table 7 represents the size of the common search space and the UE-specific search space.

TABLE 7

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for DCI formats 0 and 1A in the UE-specific search space. In this instance, the DCI formats 0 and 1A have the same size, but the UE may distinguish between the DCI formats using a flag for the DCI format 0/format 1A differentiation included in a PDCCH. Furthermore, DCI formats other than the DCI formats 0 and 1A may be required for the UE depending on a PDSCH transmission mode configured by the base station. For example, DCI formats 1, 1B and 2 may be used.

The UE in the common search space may search for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier not a UE-specific identifier.

A search space $S_k^{(L)}$ means a set of PDCCH candidates according to an aggregation level $L \in \{1,2,4,8\}$. A CCE according to a PDCCH candidate set m of the search space may be determined by the following Equation 3.

$$L \cdot \{(Y_k+m) \bmod \lfloor N_{CCE,k}/L \rfloor\}+i \quad \text{Equation 3}$$

In this case, $M^{(L)}$ represents the number of PDCCH candidates according to a CCE aggregation level L for monitoring in the search space, and m=0, ..., $M^{(L)}$−1. i is an index for designating an individual CCE in each PDCCH candidate, where i=0, ..., L−1.

As described above, the UE monitors both the UE-specific search space and the common search space in order to decode the PDCCH. In this case, the common search space (CSS) supports PDCCHs with an aggregation level of {4, 8}, and the UE-specific search space (USS) supports PDCCHs with an aggregation level of {1, 2, 4, 8}.

Table 8 represents DCCH candidates monitored by a UE.

TABLE 8

| | Search space $S_k^{(L)}$ | | |
| --- | --- | --- | --- |
| Type | Aggregation level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 3, in the case of the common search space, $Y_k$ is set to 0 with respect to two aggregation levels L=4 and L=8. On the other hand, in the case of the UE-specific search space with respect to an aggregation level L, $Y_k$ is defined as in Equation 4

$$Y_k=(A \cdot Y_{k-1}) \bmod D \quad \text{Equation 4}$$

In this case, $Y_{-1}=n_{RNTI} \neq 0$, and an RNTI value used for $n_{RNTI}$ may be defined as one of identifications of the UE. Further, A=39827, D=65537, and $k=\lfloor n_s/2 \rfloor$, where $n_s$ denotes a slot number (or index) in a radio frame.

General ACK/NACK Multiplexing Method

In a situation in which a UE shall simultaneously transmit multiple ACKs/NACKs corresponding to multiple data units received from an eNB, an ACK/NACK multiplexing method based on PUCCH resource selection may be considered to maintain single-frequency characteristics of an ACK/NACK signal and reduce ACK/NACK transmission power.

Together with ACK/NACK multiplexing, contents of ACK/NACK responses for multiple data units are identified by combining a PUCCH resource and a resource of QPSK modulation symbols used for actual ACK/NACK transmission.

For example, if one PUCCH resource transmits 4 bits and up to four data units can be transmitted, an ACK/NACK result can be identified at the eNB as indicated in the following Table 9.

TABLE 9

| HARQ-ACK(0), HARQ-ACK(1), HARQ-ACK(2), HARQ-ACK(3) | $n_{PUCCH}^{(1)}$ | b(0), b(1) |
| --- | --- | --- |
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |

TABLE 9-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In the above Table 9, HARQ-ACK(i) represents an ACK/NACK result for an i-th data unit. In the above Table 9, discontinuous transmission (DTX) means that there is no data unit to be transmitted for the corresponding HARQ-ACK(i) or that the UE does not detect the data unit corresponding to the HARQ-ACK(i). According to the above Table 9, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided, and b(0) and b(1) are two bits transmitted by using a selected PUCCH.

For example, if the UE successfully receives all of four data units, the UE transmits 2-bit (1,1) using $n_{PUCCH,1}^{(1)}$.

If the UE fails in decoding in first and third data units and succeeds in decoding in second and fourth data units, the US transmits bits (1,0) using $n_{PUCCH,3}^{(1)}$.

In ACK/NACK channel selection, if there is at least one ACK, the NACK and the DTX are coupled with each other. The reason for this is that a combination of the reserved PUCCH resource and the QPSK symbol may not all ACK/NACK states. However, if there is no ACK, the DTX is decoupled from the NACK.

In this case, the PUCCH resource linked to the data unit corresponding to one definite NACK may also be reserved to transmit signals of multiple ACKs/NACKs.

General ACK/NACK Transmission

In the LTE-A system, it considers transmitting, via a specific UL component carrier (CC), a plurality of ACK/NACK information/signals for a plurality of PDSCHs transmitted via a plurality of DL CCs. To this end, unlike ACK/NACK transmission using PUCCH format 1a/1b in the existing Rel-8 LTE, it may consider to transmit a plurality of ACK/NACK information/signals by channel-coding (e.g., Reed-Muller code, Tail-biting convolutional code) a plurality of ACK/NACK information and then using PUCCH format 2 or a new PUCCH format (i.e., E-PUCCH format) of the following block spreading based modified type.

A block spreading scheme is a scheme for modulating control signal transmission using an SC-FDMA method, unlike the existing PUCCH format 1 series or 2 series. As illustrated in FIG. 8, a symbol sequence may be spread on a time domain using an orthogonal cover code (OCC) and may be transmitted. Control signals of a plurality of UEs may be multiplexed on the same RB using the OCC. In case of the PUCCH format 2 described above, one symbol sequence is transmitted over the time domain, and the control signals of the plurality of UEs are multiplexed using a cyclic shift (CS) of a CAZAC sequence. On the other hand, in the case of the block spreading based PUCCH format (e.g., PUCCH format 3), one symbol sequence is transmitted over a frequency domain, and the control signals of the plurality of UEs are multiplexed using a time domain spreading using the OCC.

Figure 16:
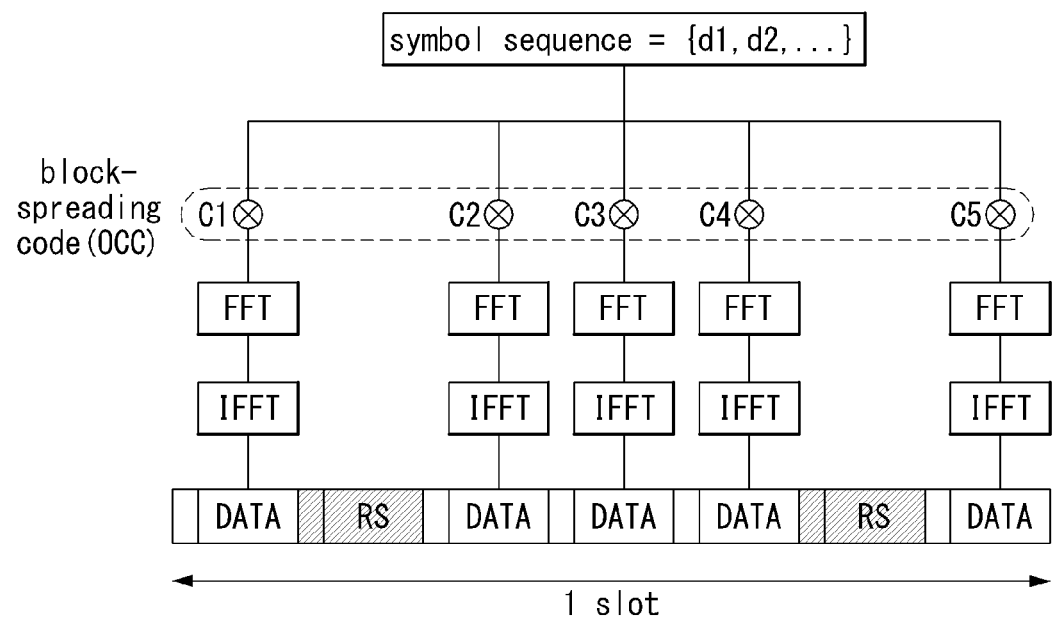
FIG. 16 illustrates an example of generating and transmitting 5 SC-FDMA symbols during one slot in a wireless communication system to which the disclosure may be applied.

FIG. 16 illustrates an example of generating and transmitting 5 SC-FDMA symbols during one slot in a wireless communication system to which the disclosure may be applied.

FIG. 16 illustrates an example of generating and transmitting five SC-FDMA symbols (i.e., data part) using an OCC of the length 5 (or SF=5) in one symbol sequence during one slot. In this case, two RS symbols may be used during one slot.

In the example of FIG. 16, the RS symbol may be generated from a CAZAC sequence, to which a specific cyclic shift value is applied, and may be transmitted in the form in which a predetermined OCC is applied (or multiplied) over a plurality of RS symbols. Further, in the example of FIG. 8, if it is assumed that 12 modulation symbols are used for each OFDM symbol (or SC-FDMA symbol) and each modulation symbol is generated by QPSK, the maximum number of bits which can be transmitted on one slot is 24 bits (=12×2). Thus, the number of bits which can be transmitted on two slots is a total of 48 bits. If a PUCCH channel structure of the block spreading scheme is used as described above, control information of an extended size can be transmitted as compared to the existing PUCCH format 1 series and 2 series.

For convenience of description, such a channel coding based method for transmitting a plurality of ACKs/NACKs using the PUCCH format 2 or the E-PUCCH format is referred to as a multi-bit ACK/NACK coding transmission method. The method refers to a method for transmitting an ACK/NACK coded block generated by channel-coding ACK/NACK information or discontinuous transmission (DTX) information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an ACK/NACK selection method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an ACK-counter method which informs the total number of ACKs (or the number of some of the ACKs) per CC with respect to all PDSCHs or DL grant PDCCHs received for each CC). In this instance, a multi-bit ACK/NACK coding or an ACK/NACK selection based ACK/NACK transmission method may be configurably applied according to a size of an ACK/NACK payload per UE, i.e., a size of an ACK/NACK payload for full or bundled ACK/NACK transmission that is configured for each UE.

ACK/NACK Transmission for LTE-A

The LTE-A system supports transmitting, via a specific UL CC, a plurality of ACK/NACK information/signals for a plurality of PDSCHs which are transmitted via a plurality of DL CCs. To this end, unlike ACK/NACK transmission using PUCCH format 1a/1b in the existing Rel-8 LTE, a plurality of ACK/NACK information may be transmitted through a PUCCH format 3.

Figure 17:
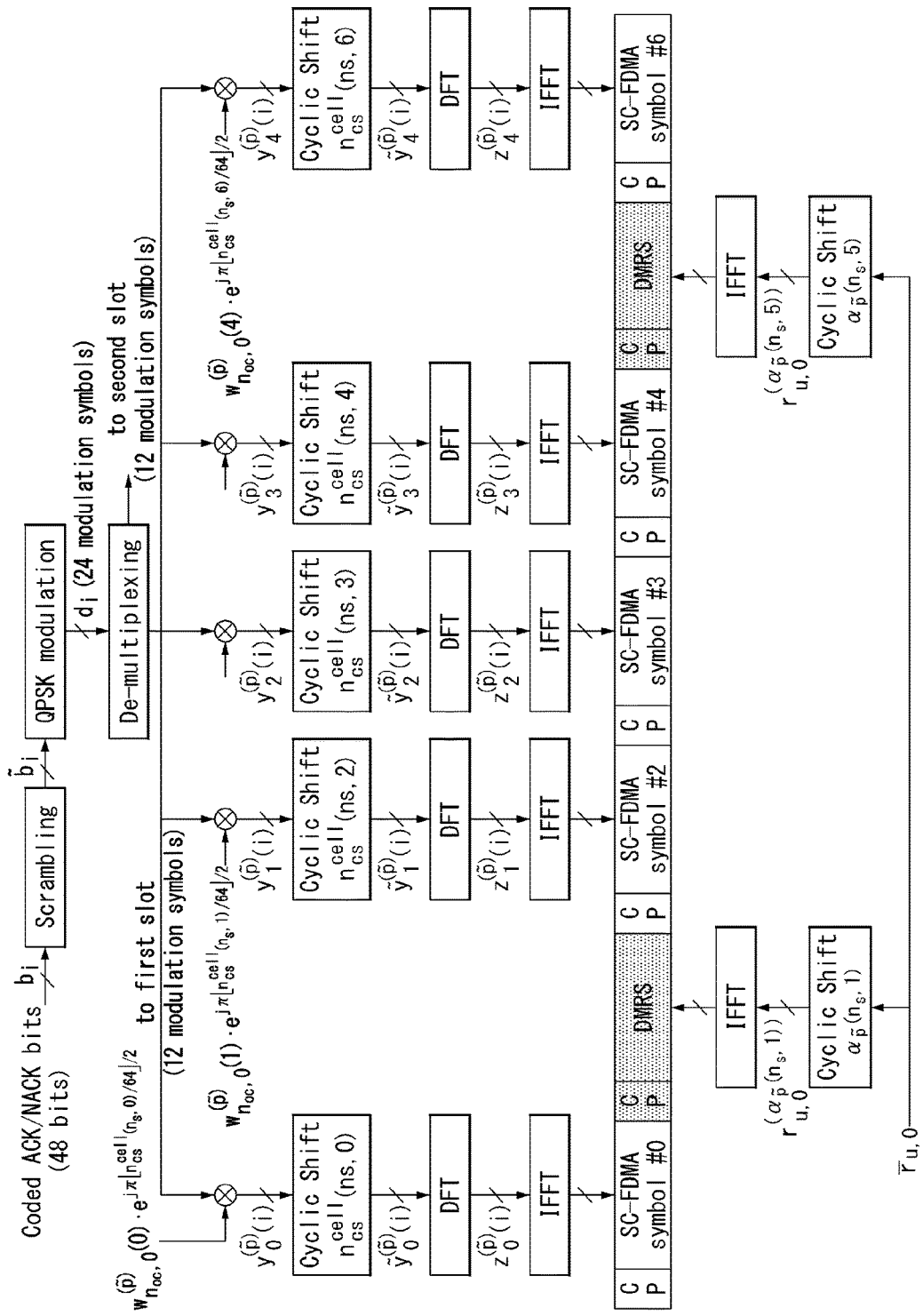
FIG. 17 illustrates an ACK/NACK channel structure for PUCCH format 3 with a normal CP.

FIG. 17 illustrates an ACK/NACK channel structure for PUCCH format 3 with a normal CP.

As illustrated in FIG. 17, a symbol sequence is transmitted by time-domain spreading by an orthogonal cover code (OCC) and may multiplex control signals of multiple UEs on the same RB using the OCC. In the PUCCH format 2 mentioned above, one symbol sequence is transmitted over a time domain and performs the UE multiplexing using a cyclic shift of a CAZAC sequence. On the other hand, in the case of the PUCCH format 3, one symbol sequence is transmitted over a frequency domain and performs the UE multiplexing using the time-domain spreading based on the OCC. FIG. 17 illustrates a method for generating and transmitting five SC-FDMA symbols from one symbol sequence using OCC of length-5 (spreading factor=5). In an example of FIG. 17, a total of two RS symbols have been used during one slot, but various applications including a method of using three RS symbols and using the OCC of spreading factor=4, etc. may be considered. In this case, the RS symbol may be generated from a CAZAC sequence with a specific cyclic shift and may be transmitted in the form in which a specific OCC is applied (or multiplied) to a plurality of RS symbols of the time domain. In the example of FIG. 17, if it is assumed that 12 modulation symbols are used for each SC-FDMA symbol and each modulation symbol uses QPSK, the maximum number of bits which can be transmitted on each slot is 24 bits (=12×2). Thus, the number of bits which can be transmitted on two slots is a total of 48 bits.

For convenience of description, such a channel coding based method for transmitting a plurality of ACKs/NACKs using the PUCCH format 2 or the E-PUCCH format is referred to as a "multi-bit ACK/NACK coding" transmission method. The method refers to a method for transmitting an ACK/NACK coded block generated by channel-coding ACK/NACK information or DTX information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an "ACK/NACK selection" method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an "ACK-counter" method which informs of the total number of ACKs (or the number of some ACKs) per CC for all PDSCHs or DL grant PDCCHs received for each CC). In this instance, a "multi-bit ACK/NACK coding" or an "ACK/NACK selection" based ACK/NACK transmission method may be configurably applied according to a size of an ACK/NACK payload per UE, i.e., a size of an ACK/NACK payload for the full or bundled ACK/NACK transmission that is configured for each UE.

In a next-generation system, in order to satisfy requirements in various application fields, a situation(s) in which a transmission time interval (TTI) can be variously set for all of or a specific physical channel and/or physical signal may be considered.

For example, when communication is performed between a base station (e.g., eNB or gNB) and a user equipment (UE) according to a scenario, for the purpose of reducing latency, a TTI used for the transmission of a physical channel, such as a PDCCH/PDSCH/PUSCH/PUCCH, may be set smaller than 1 subframe (i.e., 1 msec). Hereinafter, in the disclosure, a physical channel to which a short transmission time unit is applied compared to the existing transmission time unit (e.g., 1 subframe) may be represented in a form in which (s) has been added to the existing channel (e.g., sPDCCH/sPDSCH/sPUSCH/sPUCCH). Furthermore, a plurality of physical channels may be present within a single subframe (e.g., 1 msec) with respect to a single user equipment or a plurality of UEs. A TTI may be differently set for each of the physical channels.

Hereinafter, in the embodiments proposed in the disclosure, for convenience of description, proposed methods and examples are described based on the existing LTE system. In this case, a TTI is a common subframe size in an LTE system and may be 1 msec (hereinafter a normal TTI). Furthermore, a short TTI (sTTI) denotes a value smaller than the 1 msec, and may be a single orthogonal frequency-division multiplexing (OFDM) symbol or a-plurality-of-OFDM symbol unit or a single carrier-frequency division multiple access (SC-FDMA) symbol unit.

For example, if a subcarrier spacing is subframes of 15 kHz, the subframe may be split into 6 subslots based on Table 10. In this case, a subslot unit may correspond to the above sTTI unit.

Table 10 shows an example of the number of (OFDM) symbols in other subslots of an i-th subframe (subframe i).

TABLE 10

| Subslot number | 0 | 1 | 2 | 3 | 4 | 5 |
|---|---|---|---|---|---|---|
| Slot number | 2i | | | 2i + 1 | | |
| Uplink subslot pattern | 0, 1, 2 | 3, 4 | 5, 6 | 0, 1 | 2, 3 | 4, 5, 6 |
| Downlink subslot pattern 1 | 0, 1, 2 | 3, 4 | 5, 6 | 0, 1 | 2, 3 | 4, 5, 6 |
| Downlink subslot pattern 2 | 0, 1 | 2, 3, 4 | 5, 6 | 0, 1 | 2, 3 | 4, 5, 6 |

Specifically, in the case of FDD in an LTE system, 10 subframes, 20 slots or 60 subslots may be used for downlink transmission and 10 subframes, 20 slots or 60 subslots may be used for UL transmission within each 10 msec interval. In this case, the UL transmission and the downlink transmission may be separated on a frequency domain. A user equipment cannot perform transmission and reception at the same time in the case of a half-duplex FDD operation, but has not such restriction in the case of a full-duplex FDD operation.

Hereinafter, in the embodiments proposed in the disclosure, for convenience of description, in describing the proposed methods, a case where a short TTI (i.e., if a TTI length is smaller than a subframe) has been assumed, but the methods proposed in the disclosure may be extended and applied to a case where a TTI is longer than a subframe or is 1 msec or more. Furthermore, particularly, in a next-generation system (e.g., the NR system), a short TTI may be introduced in a form in which the numerology (e.g., subcarrier spacing) is increased. Even in this case, the methods proposed in the disclosure may be extended and applied.

That is, hereinafter, for convenience of description, the disclosure is described based on an LTE system, but corresponding contents may also be applied to a technology in which other waveforms and/or frame structures are used, such as a new radio access technology (new RAT or NR). In general, in the disclosure, the case of an sTTI (<1 msec), a long TTI (=1 msec) or a longer TTI (>1 msec) is assumed.

Furthermore, a symbol, subslot slot, subframe and frame described in the following embodiments described in the disclosure may correspond to detailed examples of a given time unit (e.g., transmission time unit) used in a wireless communication system. That is, in applying the methods proposed in the disclosure, a time unit described in the disclosure may be substituted with other time units applied in other wireless communication systems and applied.

Furthermore, the embodiments described in the disclosure have been merely divided for convenience of description, and some methods and/or some configurations of an embodiment may be substituted with a method and/or configuration of another embodiment or they may be combined and applied.

First Embodiment

First, if the transmission of a subslot unit is scheduled, a method of transmitting and receiving a PDSCH by considering DMRS sharing (hereinafter DMRS sharing) is described. In the disclosure, DMRS sharing may mean a method of sharing a DMRS between (contiguously scheduled, disposed or assigned) PDSCHs.

Specifically, in the case of a subslot-PDSCH (i.e., PDSCH scheduled in a subslot unit), DMRS sharing may be permitted in order to reduce overhead attributable to a DMRS. In this case, in order to prevent performance degradation of channel estimation, DMRS sharing may be permitted between two subslots only. If DMRS sharing is applied, a rule has been defined so that a corresponding DMRS is always mapped to the former subslot of two subslots by considering the processing time of a user equipment.

According to the current standard (e.g., 3GPP standard), if it is indicated that a user equipment has not detected sDCI in an (n−1)-th subslot (hereinafter subslot #n−1) and a DMRS is not present in an n-th subslot (hereinafter subslot #n) through sDCI detected in the subslot #n, the user equipment does not expect the decoding of a subslot-PDSCH in the subslot #n.

In the disclosure, sDCI transmitted (or forwarded) and detected in a subslot #n and/or a subslot #n−1 may mean sDCI for a DL allocation usage, that is, DL assignment sDCI. Furthermore, the corresponding sDCI may correspond to a control channel (e.g., PDCCH or subslot-PDCCH) transmitted (or forwarded) and detected in a subslot #n and/or a subslot #n−1.

However, as described above, assuming that a rule has been defined, if sDCI detected by a user equipment in a subslot #n−1 indicates that a DMRS is not present in the subslot #n−1 and sDCI detected by a user equipment in a subslot #n indicates that a DMRS is not present in the subslot #n, ambiguity for the behavior of the user equipment may occur. Such a case may occur when the user equipment has mis-detected sDCI in the subslot #n and/or the subslot #n−1 or may occur due to the erroneous scheduling of a base station.

Accordingly, a rule may be defined so that a user equipment does not expect scheduling, such as the above case. In other words, a rule may be defined so that a user equipment does not expect that a DMRS is not present in sDCI detected in contiguous subslots. That is, a user equipment may be configured to not expect that sDCIs detected in a subslot #n and subslot #n−1 indicate a DMRS absence in the subslot #n and a DMRS absence in the subslot #n−1, respectively. This may mean that a base station does not schedule that the sDCIs detected in the subslot #n and the subslot #n−1 indicate a DMRS absence in the subslot #n and a DMRS absence in the subslot #n−1.

And/or if it has been indicated or configured to a user equipment that a DMRS is not present in each subslot based on sDCI detected in contiguous subslots (i.e., subslot #n and subslot #n−1), the user equipment may be configured to not expect (or to require) the decoding of a PDSCH in a corresponding subslot (i.e., subslot #n). Alternatively, in the above case, the user equipment may be configured to skip PDSCH decoding in the corresponding subslot #n. In this case, a rule may be defined so that the user equipment reports (to the base station) HARQ-ACK information for the corresponding PDSCH (i.e., PDSCH in the subslot #n). For example, the HARQ-ACK information may be NACK information for the corresponding PDSCH.

Furthermore, as in the above description, a case where it is indicated to a user equipment that a DMRS is not present in a subslot #n through sDCI detected in the subslot #n is assumed. In this case, if resource allocation (e.g., physical resource block group (PRG) or physical resource block (PRB)) by sDCI detected in a subslot #n−1 does not include resource allocation by the sDCI detected in the subslot #n, a problem may occur due to the DMRS absence in relation to the PDSCH processing of the user equipment in the subslot #n. That is, if a PDSCH resource(s) in the subslot #n−1 does not include the PDSCH resource in the subslot #n, PDSCH processing in a corresponding subslot may be problematic because a DMRS is not present in the subslot #n.

By considering such a point, in the situation in which it has been indicated to a user equipment that a DMRS is not present in a subslot #n through sDCI detected in the subslot #n, a rule may be defined so that resource allocation in the subslot #n corresponds to a subset relation with resource allocation in a subslot #n−1. For example, the subset relation may mean that the resource allocation in the subslot #n is the same as the resource allocation in the subslot #n−1 or is included in the resource allocation in the subslot #n−1.

And/or in the situation in which it has been indicated to a user equipment that a DMRS is not present in a subslot #n through sDCI detected in the subslot #n, if resource allocation by sDCI detected in a subslot #n−1 is not the same as resource allocation by sDCI detected in the subslot #n or does not include the resource allocation by the sDCI detected in the subslot #n, the user equipment may be configured to not expect (or require) that it should decode a PDSCH in a corresponding subslot (i.e., subslot #n). Alternatively, in the above case, the user equipment may be configured to skip PDSCH decoding in the corresponding subslot #n. In this case, a rule may be defined so that the user equipment reports (to a base station) HARQ-ACK information for a corresponding PDSCH (i.e., PDSCH in the subslot #n). For example, the HARQ-ACK information may be NACK information for the corresponding PDSCH.

Furthermore, in the situation in which it has been indicated to a user equipment that a DMRS is not present in a subslot #n through sDCI detected in the subslot #n, a method of determining whether to decode a PDSCH by considering the number of resources (e.g., the number of resource blocks (RBs)) non-overlapped between resource allocation in a subslot #n−1 and resource allocation in the subslot #n may also be considered.

For example, if the number of resources overlapped between resource allocation in a subslot #n−1 and resource allocation in a subslot #n is less than a given value, a user equipment may be configured to decode a PDSCH in the subslot #n.

In contrast, if the number of resources overlapped between resource allocation in the subslot #n−1 and resource allocation in the subslot #n is the given value or more, the user equipment may be configured to not expect (or require) the decoding of a PDSCH in a corresponding subslot (i.e., the subslot #n). Alternatively, in the above case, the user equipment may be configured to skip PDSCH decoding in the corresponding subslot #n. In this case, a rule may be defined so that the user equipment reports (to a base station) HARQ-ACK information (e.g., NACK information) for the corresponding PDSCH (i.e., a PDSCH in the subslot #n).

Furthermore, according to an LTE system (particularly, according to the standard of a current LTE system), (DL) DMRS sharing between subslots belonging to different subframes may not be permitted. Accordingly, if it has been indicated to a user equipment that a DMRS is not present in a subslot #0 through sDCI detected in the subslot #0, the corresponding user equipment cannot obtain a DMRS for demodulating a PDSCH received in the subslot #0.

By considering such a point, a rule may be defined so that a user equipment does not expect that it will be indicated that a DMRS is not present through sDCI detected in a subslot #0. In other words, a rule may be defined so that the user equipment assumes that a DMRS is present in sDCI detected in the subslot #0. That is, the corresponding user equipment may be configured to assume that it will be indicated that a DMRS is present in the subslot #0 through sDCI detected in the subslot #0.

And/or in the situation in which it has been indicated to a user equipment that a DMRS is not present in a subslot #0 through sDCI detected in the subslot #0, the corresponding user equipment may be configured to not expect (or require) that it should decode a PDSCH in the subslot #0. Alternatively, in the above case, the user equipment may be configured to skip PDSCH decoding in the corresponding subslot #0. In this case, a rule may be defined so that the user equipment reports (to a base station) HARQ-ACK information for the corresponding PDSCH (i.e., a PDSCH in the subslot #0). For example, the HARQ-ACK information may be NACK information for the corresponding PDSCH.

Furthermore, according to an LTE system (particularly, according to the standard of a current LTE system), a DL subslot pattern may be differently configured (or constructed) depending on the number of symbols in a PDCCH control region. In this case, the subslot pattern may be represented like Table 10. As a detailed example, if the number of symbols in a PDCCH control region is 1 or 3, a DL subslot pattern may follow the DL subslot pattern 1 of Table 10. If the number of symbols in a PDCCH control region is 2, a DL subslot pattern may follow the DL subslot pattern 2 of Table 10. Furthermore, only if the number of symbols in a PDCCH control region is 1, a DMRS-based PDSCH may be scheduled in a subslot #0. Accordingly, in order for a DMRS for the PDSCH of a subslot #1 to be shared from the subslot #0, it is possible only when the condition is established. If not, the user equipment cannot obtain a DMRS for the demodulation of the PDSCH of the subslot #1.

By considering such a point, if the number of symbols in a PDCCH control region is 2 or 3, a rule may be defined so that a user equipment does not expect that the absence of a DMRS in a corresponding subslot is indicated through sDCI detected in a subslot #1. In other words, a rule may be defined so that the user equipment assumes that a DMRS is present in the sDCI detected in the subslot #1. That is, the user equipment may be configured to assume that the presence of a DMRS in a corresponding subslot is indicated through the sDCI detected in the subslot #1.

And/or in the situation in which the number of symbols in a PDCCH control region is 2 or 3, if it has been indicated to a user equipment that a DMRS is not present in a subslot #1 through sDCI detected in the subslot #1, the corresponding user equipment may be configured to not expect (or require) that it should decode a PDSCH in the subslot #1. Alternatively, in the above case, the user equipment may be configured to skip PDSCH decoding in the corresponding subslot #1. In this case, a rule may be defined so that the user equipment reports (to a base station) HARQ-ACK information for the corresponding PDSCH (i.e., PDSCH in the subslot #1). For example, the HARQ-ACK information may be NACK information for the corresponding PDSCH.

Figure 18:
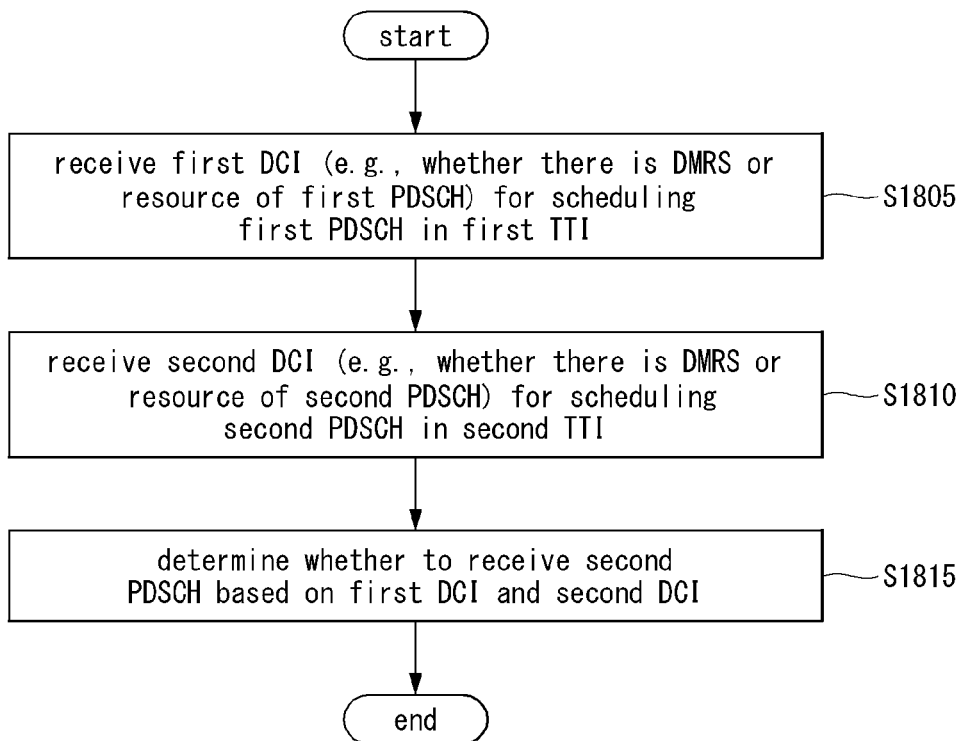
FIG. 18 is a flowchart illustrating example operations of a UE to determine whether to receive a downlink data channel to which a method proposed according to an embodiment is applicable.
Figure 19:
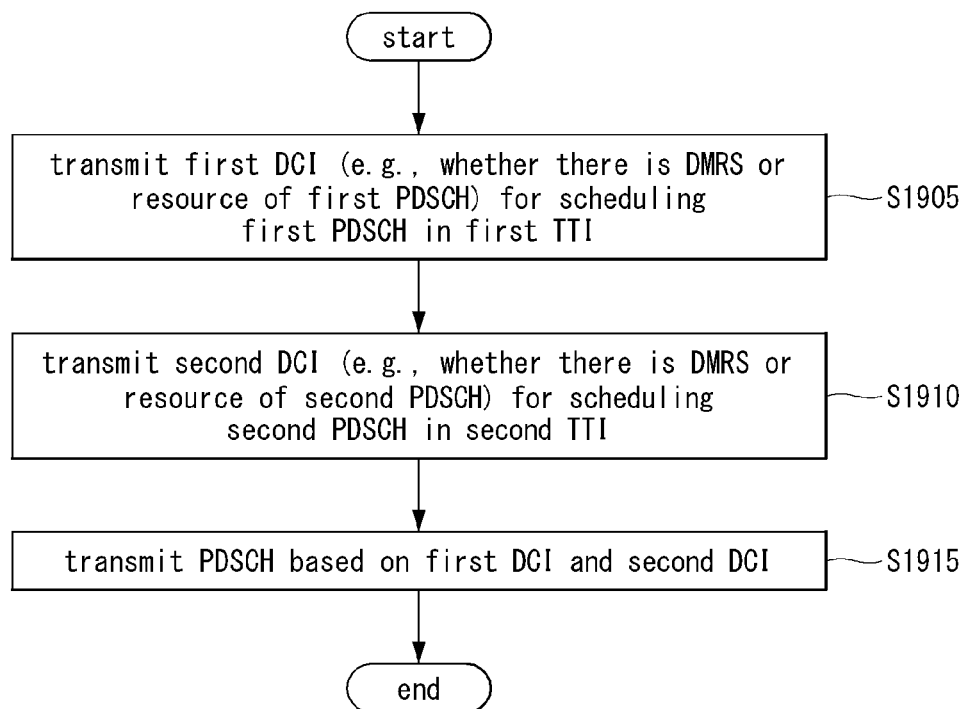
FIG. 19 is a flowchart illustrating example operations of a base station to transmit a downlink data channel to which a method proposed according to an embodiment is applicable.

FIGS. 18 and 19 and the following description in connection therewith regard methods and apparatuses for operating a UE and a base station which perform transmission and reception of a data channel (e.g., a PDSCH or PUSCH) as proposed herein. Although the methods of FIGS. 18 and 19 are described in connection with the PDSCH for ease of description, the methods may also be applicable to various data channel and/or demodulation reference signals used in wireless communication systems.

Referring to FIG. 18, a case where a user equipment is configured to receive or not receive a PDSCH in a specific subslot (i.e., specific TTI) based on the method(s) described in the present embodiment is assumed. Furthermore, in the method described in FIG. 18, a case where DCI (in this case, DCI may correspond to a PDCCH) and/or a PDSCH is scheduled in a subslot unit is assumed.

First, the user equipment may receive first DCI (e.g., the aforementioned sDCI) for the scheduling of a first PDSCH in a first TTI (e.g., subslot #n−1) (S1805). For example, the first DCI may include information indicating whether a DMRS for the first PDSCH is present in the first TTI, information on resource allocation (e.g., PRB or PRG) for the first PDSCH, etc.

Thereafter, the user equipment may receive second DCI (e.g., the aforementioned sDCI) for the scheduling of a second PDSCH in a second TTI (e.g., the subslot #n) (S1810). For example, the second DCI may include information indicating whether a DMRS for the second PDSCH is present in the second TTI, information on resource allocation (e.g., PRB or PRG) for the second PDSCH, etc. In this case, the second TTI may mean a time unit consecutively disposed on a time domain with respect to the first TTI.

In this case, the user equipment may determine whether to receive (i.e., decode) the second PDSCH based on the first DCI and the second DCI (S1815). Specifically, if the PDSCH absence of the second DMRS is indicated or configured in the second TTI by the second DCI, the user equipment may be configured to determine whether to receive the second PDSCH by considering (all of) information included in the first DCI and information included in the second DCI.

For example, as described above in the present embodiment, if it has been indicated or configured to a user equipment that a DMRS is not present in each TTI through (s)DCIs detected in a contiguous first TTI (e.g., subslot #n−1) and second TTI (e.g., subslot #n), the corresponding user equipment may be configured to not expect that it should decode a PDSCH (i.e., second PDSCH) in the second TTI (e.g., subslot #n). Alternatively, in the above case, the corresponding user equipment may be configured to skip the decoding of the second PDSCH. In this case, a rule may be defined so that the corresponding user equipment reports, to a base station, HARQ-ACK information (e.g., NACK information) for the second PDSCH.

For another example, as described above in the present embodiment, in the situation in which it has been indicated to a user equipment that a DMRS is not present in a second TTI through (s)DCI detected in the second TTI (e.g., subslot #n), if resource allocation by (s)DCI detected in a first TTI (e.g., subslot #n−1) is not the same as or does not include resource allocation by the (s)DCI detected in the second TTI, the user equipment may be configured to not expect (or require) that it should decode a PDSCH (i.e., the second PDSCH) in the second TTI. Alternatively, in the above case, the user equipment may be configured to skip the decoding of the second PDSCH. In this case, a rule may be defined so that the user equipment reports HARQ-ACK information (e.g., NACK information) for the second PDSCH to a base station.

Figure 22:
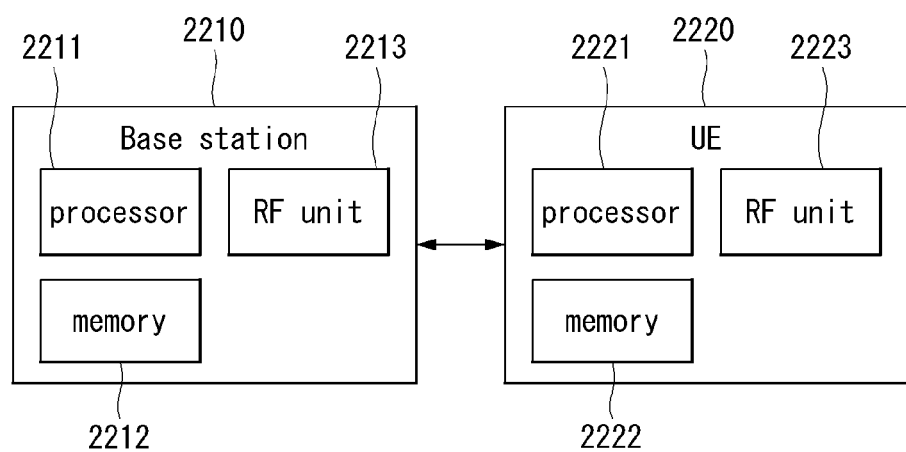
FIG. 22 is a block diagram illustrating a configuration of a wireless communication device to which methods proposed according to the disclosure are applicable.

In connection with this, in an implementational aspect, the above-described UE operations may be specifically implemented by the UEs 2220 and 2320 shown in FIGS. 22 and 23. For example, the above-described UE operations may be performed by the processors 2221 and 2321 and/or the radio frequency (RF) units (or modules) 2223 and 2325.

In a wireless communication system, a UE receiving a data channel (e.g., a PDSCH) may include a transmitter for transmitting wireless signals, a receiver for receiving wireless signals, and a processor functionally connected with the transmitter and the receiver. Here, the transmitter and the receiver (or transceiver) may be referred to as RF units (or modules) for transmitting and receiving wireless signals.

For example, the processor may control the RF unit to receive a first DCI (e.g., the above-described sDCI) for scheduling a first PDSCH in a first TTI (e.g., the above-described subslot #n−1). As an example, the first DCI may include, e.g., information indicating whether a DMRS for the first PDSCH is present in the first TTI and information for resource allocation (e.g., PRB or PRG) for the first PDSCH.

Thereafter, the processor may control the RF unit to receive a second DCI (e.g., the above-described sDCI) for scheduling a second PDSCH in a second TTI (e.g., the above-described subslot #n). As an example, the second DCI may include, e.g., information indicating whether a DMRS for the second PDSCH is present in the second TTI and information for resource allocation (e.g., PRB or PRG) for the second PDSCH. At this time, the second TTI may mean a time unit which is placed continuously with the first TTI in the time domain.

At this time, the processor may perform control to determine whether to receive (i.e., decode) the second PDSCH based on the first DCI and the second DCI. Specifically, where the absence of the DMRS of the second PDSCH is indicated or set in the second TTI by the second DCI, the processor may be configured to determine whether to receive the second PDSCH considering (both) information contained in the first DCI and information contained in the second DCI.

For example, as described above in the instant embodiment, where the UE receives an indication or setting of the absence of a DMRS in each TTI by the (s) DCIs detected in the continuous first TTI (e.g., subslot #n−1) and second TTI (e.g., subslot #n), the processor may be configured not to expect decoding of the PDSCH (i.e., the second PDSCH) in the second TTI (e.g., subslot #n). Or, in the above-described case, the processor may be configured to skip decoding of the second PDSCH. At this time, there may be defined a rule to allow the UE to report HARQ-ACK information (e.g., NACK information) for the second PDSCH to the base station.

As another example, as described above in the instant embodiment, if the resource allocation by the (s)DCI detected in the first TTI (e.g., subslot #n−1) is not identical to the resource allocation by the (s)DCI detected in the second TTI or this is not included in the context where the UE has received an indication of the absence of the DMRS in the second TTI via the (s)DCI detected in the second TTI (e.g., subslot #n), the processor may be configured not to expect (or be required for) decoding of the PDSCH (i.e., the second PDSCH) in the second TTI. Or, in the above-described case, the processor may be configured to skip decoding of the second PDSCH. At this time, there may be defined a rule to allow the UE to report HARQ-ACK information (e.g., NACK information) for the second PDSCH to the base station.

FIG. 19 is a flowchart illustrating example operations of a base station to transmit a downlink data channel to which a method proposed according to an embodiment is applicable. FIG. 19 is intended merely for illustration purposes but not for limiting the scope of the disclosure.

Referring to FIG. 19, it is assumed that the UE does not, or is configured not to, receive a PDSCH in a specific subslot (i.e., a specific TTI) based on the method(s) described in the instant embodiment. It is also assumed in the method described in connection with FIG. 19 that DCIs (which may correspond to PDCCHs) and/or PDSCHs are scheduled in subslot units.

The base station may transmit a first DCI (e.g., the above-described sDCI) for scheduling a first PDSCH to the UE in a first TTI (e.g., the above-described subslot #n−1) (S1905). As an example, the first DCI may include, e.g., information indicating whether a DMRS for the first PDSCH is present in the first TTI and information for resource allocation (e.g., PRB or PRG) for the first PDSCH.

The base station may transmit a second DCI (e.g., the above-described sDCI) for scheduling a second PDSCH to the UE in a second TTI (e.g., the above-described subslot #n) (S1910). As an example, the second DCI may include, e.g., information indicating whether a DMRS for the second PDSCH is present in the second TTI and information for resource allocation (e.g., PRB or PRG) for the second PDSCH. At this time, the second TTI may mean a time unit which is placed continuously with the first TTI in the time domain.

The base station may transmit the PDSCHs (i.e., the first PDSCH and the second PDSCH) to the UE based on the first DCI and the second DCI (S1915).

At this time, the UE may determine whether to receive (i.e., decode) the second PDSCH based on the first DCI and the second DCI. Specifically, where the absence of the DMRS of the second PDSCH is indicated or set in the second TTI by the second DCI, the UE may be configured to determine whether to receive the second PDSCH considering (both) information contained in the first DCI and information contained in the second DCI.

For example, as described above in the instant embodiment, where the UE receives an indication or setting of the absence of a DMRS in each TTI by the (s) DCIs detected in the continuous first TTI (e.g., subslot #n−1) and second TTI (e.g., subslot #n), the UE may be configured not to expect decoding of the PDSCH (i.e., the second PDSCH) in the second TTI (e.g., subslot #n). Or, in the above-described case, the UE may be configured to skip decoding of the second PDSCH. At this time, there may be defined a rule to allow the UE to report HARQ-ACK information (e.g., NACK information) for the second PDSCH to the base station.

As another example, as described above in the instant embodiment, if the resource allocation by the (s)DCI detected in the first TTI (e.g., subslot #n−1) is not identical to the resource allocation by the (s)DCI detected in the second TTI or this is not included in the context where the UE has received an indication of the absence of the DMRS in the second TTI via the (s)DCI detected in the second TTI (e.g., subslot #n), the UE may be configured not to expect (or be required for) decoding of the PDSCH (i.e., the second PDSCH) in the second TTI. Or, in the above-described case, the UE may be configured to skip decoding of the second PDSCH. At this time, there may be defined a rule to allow the UE to report HARQ-ACK information (e.g., NACK information) for the second PDSCH to the base station.

In connection with this, in an implementational aspect, the above-described base station operations may be specifically implemented by the base stations 2210 and 2310 shown in FIGS. 22 and 23. For example, the above-described base station operations may be performed by the processors 2211 and 2311 and/or the radio frequency (RF) units (or modules) 2213 and 2315.

In a wireless communication system, a base station transmitting a data channel (e.g., a PDSCH) may include a transmitter for transmitting wireless signals, a receiver for receiving wireless signals, and a processor functionally connected with the transmitter and the receiver. Here, the transmitter and the receiver (or transceiver) may be referred to as RF units (or modules) for transmitting and receiving wireless signals.

For example, the processor may control the RF unit to transmit a first DCI (e.g., the above-described sDCI) for scheduling a first PDSCH to the UE in a first TTI (e.g., the above-described subslot #n−1) (S1905). As an example, the first DCI may include, e.g., information indicating whether a DMRS for the first PDSCH is present in the first TTI and information for resource allocation (e.g., PRB or PRG) for the first PDSCH.

The processor may control the RF unit to transmit a second DCI (e.g., the above-described sDCI) for scheduling a second PDSCH to the UE in a second TTI (e.g., the above-described subslot #n) (S1910). As an example, the second DCI may include, e.g., information indicating whether a DMRS for the second PDSCH is present in the second TTI and information for resource allocation (e.g., PRB or PRG) for the second PDSCH. At this time, the second TTI may mean a time unit which is placed continuously with the first TTI in the time domain.

The processor may control the RF unit to transmit the PDSCHs (i.e., the first PDSCH and the second PDSCH) to the UE based on the first DCI and the second DCI (S1915).

At this time, the UE may determine whether to receive (i.e., decode) the second PDSCH based on the first DCI and the second DCI. Specifically, where the absence of the DMRS of the second PDSCH is indicated or set in the second TTI by the second DCI, the UE may be configured to determine whether to receive the second PDSCH considering (both) information contained in the first DCI and information contained in the second DCI.

For example, as described above in the instant embodiment, where the UE receives an indication or setting of the absence of a DMRS in each TTI by the (s) DCIs detected in the continuous first TTI (e.g., subslot #n−1) and second TTI (e.g., subslot #n), the UE may be configured not to expect decoding of the PDSCH (i.e., the second PDSCH) in the second TTI (e.g., subslot #n). Or, in the above-described case, the UE may be configured to skip decoding of the second PDSCH. At this time, there may be defined a rule to allow the UE to report HARQ-ACK information (e.g., NACK information) for the second PDSCH to the base station.

As another example, as described above in the instant embodiment, if the resource allocation by the (s)DCI detected in the first TTI (e.g., subslot #n−1) is not identical to the resource allocation by the (s)DCI detected in the second TTI or this is not included in the context where the UE has received an indication of the absence of the DMRS in the second TTI via the (s)DCI detected in the second TTI (e.g., subslot #n), the UE may be configured not to expect (or be required for) decoding of the PDSCH (i.e., the second PDSCH) in the second TTI. Or, in the above-described case, the UE may be configured to skip decoding of the second PDSCH. At this time, there may be defined a rule to allow the UE to report HARQ-ACK information (e.g., NACK information) for the second PDSCH to the base station.

Second Embodiment

Described next is a method of transmitting/receiving a PUSCH considering DMRS sharing when transmission in subslot units is scheduled. In the disclosure, DMRS sharing may mean a scheme of sharing a DMRS between PUSCHs (continuously scheduled, arranged, or allocated).

Also in this embodiment, the subslot configuration as shown in Table 10 described above in connection with the first embodiment may apply. For example, one subframe (or frame) may include two slots, and each slot may include three subslots.

Specifically, for the three subslots included in the first slot (e.g., slot #2i) of the two slots, the first subslot (e.g., subslot #0) may include three symbols (e.g., symbols #0, #1, and #2), the second subslot (e.g., subslot #1) may include two symbols (e.g., symbols #3 and #4), and the third subslot (e.g., subslot #2) may include two symbols (e.g., symbols #5 and #6). For the three subslots included in the second slot (e.g., slot #2i+1) of the two slots, the first subslot (e.g., subslot #3) may include three symbols (e.g., symbols #0, #1, and #2), the second subslot (e.g., subslot #4) may include two symbols (e.g., symbols #3 and #4), and the third subslot (e.g., subslot #5) may include two symbols (e.g., symbols #5 and #6).

At this time, the start position (e.g., the start symbol) of the PUSCH transmission and/or the mapping position (e.g., mapping symbol) related to the PUSCH transmission may be set and/or indicated dynamically via a DCI. Hereinafter, the DCIs mentioned below may be UL DCIs (i.e., UL-related DCIs) (e.g., DCI formats 7-0A/7-0B) related to uplink scheduling.

Typically, mapping of subslot-considered PUSCH and PUSCH-related DMRS to a physical resource may be performed as follows.

First, a method of mapping a subslot-unit PUSCH to a physical resource is described.

In the case of the subslot-unit PUSCH, the start of mapping of the physical resource may be determined based on a specific field (e.g., DMRS-pattern field) in the relevant UL DCI format (i.e., the UL grant) and the UL subslot number in the subframe allocated for PUSCH transmission. As an example, the start symbol index I for subslot-unit PUSCH transmission may be determined as shown in Table 11. Table 11 represents an example of configuring a start symbol index for subslot-unit PUSCH transmission.

TABLE 11

| DMRS-pattern field in uplink-related DCI format [3] | Uplink subslot number | | | | | |
|---|---|---|---|---|---|---|
| | #0 | #1 | #2 | #3 | #4 | #5 |
| 00 | 1 | 4 | 6 | 1 | 3 | 5 |
| 01 | 0 | 3 | 5 | 0 | 2 | — |
| 10 | — | 3 | — | 0 | 2 | — |
| 11 | — | 3 | — | — | 2 | — |

For example, where the value of the information (e.g., DMRS-pattern field) for the DMRS pattern of the UL DCI scheduling subslot #2 indicates '01,' the start symbol of the subslot-unit PUSCH transmission may be the sixth symbol (i.e., symbol #5) of the slot (i.e., the first slot). As another example, where the value of the information for the DMRS pattern of the UL DCI scheduling subslot #4 indicates '11,' the start symbol of the subslot-unit PUSCH transmission may be the third symbol (i.e., symbol #2) of the slot (i.e., the second slot).

Further, in the case of semi-persistent scheduling (SPS) (e.g., higher layer parameter sps-ConfigUL-sTTI-r15 is set) set in the periodicity of one subslot (e.g., semiPersistSched-IntervalUL-STTI-r15 is set as sTTI1) and the subslot-unit PUSCH transmission, the mapping may be started at the symbol I which is based on the specific field (e.g., DMRS-pattern field) in the relevant UL DCI format (i.e., the UL grant). As an example, the start symbol index for subslot-unit PUSCH transmission set as the SPS with a periodicity of one subslot may be determined as shown in Table 12. Table 12 represents another example of configuring a start symbol index for subslot-unit PUSCH transmission.

TABLE 12

| DMRS-pattern field in uplink-related DCI format [3] | Uplink subslot number | | | | | |
|---|---|---|---|---|---|---|
| | #0 | #1 | #2 | #3 | #4 | #5 |
| 00 | 1 | 4 | 6 | 1 | 3 | 5 |
| 10 | 1 | 3 | 6 | 0 | 3 | 5 |

For example, where the value of the information for the DMRS pattern of the UL DCI scheduling subslot #2 indicates '00,' the start symbol of the subslot-unit PUSCH transmission may be the seventh symbol (i.e., symbol #6) of the slot (i.e., the first slot). As another example, where the value of the information for the DMRS pattern of the UL DCI scheduling subslot #4 indicates '10,' the start symbol of the subslot-unit PUSCH transmission may be the fourth symbol (i.e., symbol #3) of the slot (i.e., the second slot).

Further, in the case of the subslot-unit PUSCH set as the SPS with a periodicity larger than one subslot, the above-described PUSCH mapping may be started at the symbol I according to the case where the 'DMRS-pattern field in uplink related DCI format' in Table 12 is set to '00.'

Described next is a method of mapping the DMRS related to the subslot-unit PUSCH to the physical resource.

For each antenna port used for transmission of PUSCH, the PUSCH sequence) ($\tilde{r}_{PUSCH}^{(\tilde{p})}(\cdot)$) may be multiplied by the amplitude scaling factor ($\sqrt{1+\delta}\beta_{PUSCH}$) and may sequentially be mapped to the resource block(s) (RB(s)), starting with ($\tilde{r}_{PUSCH}^{(\tilde{p})}(0)$). Here, for any one case of: i) a higher layer parameter ul-DMRS-IFDMA is configured, and the latest UL DCI includes a cyclic shift mapping-related field (e.g., Cyclic Shift Field mapping table for DMRS bit field) indicating the use of Table 13; or ii) the cyclic shift mapping-related field is configured in the latest UL DCI format 7 indicating the use of Table 14 below, $\delta=1$. Otherwise, $\delta=0$.

Table 13 represents an example mapping relationship for the cyclic shift-related field.

case, the mapping needs to be performed in the order of first increasing k only for the k values meeting k mod 2=$\bar{\omega}$.

At this time, I (i.e., the time resource index) may be set based on the latest UL DCI DMRS pattern information (e.g., DMRS-pattern field) and the UL subslot number according to Table 15 or 16 below.

Table 15 represents an example DMRS transmission (or mapping) symbol index configuration for the subslot-unit PUSCH.

TABLE 15

| DMRS-pattern field in uplink-related DCI format [3] | Uplink subslot number | | | | | |
|---|---|---|---|---|---|---|
| | #0 | #1 | #2 | #3 | #4 | #5 |
| 00 | 0 | 3 | 5 | 0 | 2 | 4 |
| 01 | 2 | 4 | — | 1 | 3 | — |
| 10 | — | — | — | 2 | — | — |
| 11 | — | 5 | — | — | 4 | — |

For example, where the value of the information for the DMRS pattern of the UL DCI scheduling subslot #1 indi-

TABLE 13

| Cyclic Shift Field in uplink-related DCI format | | $n_{DMRS,\lambda}^{(2)}$ | | | | [$w^{(\lambda)}(0)\ w^{(\lambda)}(1)$] | | | |
|---|---|---|---|---|---|---|---|---|---|
| [3] | $\bar{\omega}$ | $\lambda=0$ | $\lambda=1$ | $\lambda=2$ | $\lambda=3$ | $\lambda=0$ | $\lambda=1$ | $\lambda=2$ | $\lambda=3$ |
| 000 | 1 | 0 | 6 | 3 | 9 | [1 1] | [1 1] | [1 -1] | [1 -1] |
| 001 | 1 | 6 | 0 | 9 | 3 | [1 -1] | [1 -1] | [1 1] | [1 1] |
| 010 | 1 | 3 | 9 | 6 | 0 | [1 -1] | [1 -1] | [1 1] | [1 1] |
| 011 | 0 | 4 | 10 | 7 | 1 | [1 1] | [1 1] | [1 1] | [1 1] |
| 100 | 0 | 2 | 8 | 5 | 11 | [1 1] | [1 1] | [1 1] | [1 1] |
| 101 | 0 | 8 | 2 | 11 | 5 | [1 -1] | [1 -1] | [1 -1] | [1 -1] |
| 110 | 0 | 10 | 4 | 1 | 7 | [1 -1] | [1 -1] | [1 -1] | [1 -1] |
| 111 | 1 | 9 | 3 | 0 | 6 | [1 1] | [1 1] | [1 -1] | [1 -1] |

Table 14 represents an example of subslot-unit PUSCH and/or an example of slot-unit PUSCH.

cates '01,' it may be set and/or indicated to the UE that the DMRS for the subslot-unit PUSCH transmission is trans-

TABLE 14

| Cyclic Shift Field in uplink-related DCI format | $n_{DMRS,\lambda}^{(2)}$ | | | | $\bar{\omega}$ | | | |
|---|---|---|---|---|---|---|---|---|
| [3] | $\lambda=0$ | $\lambda=1$ | $\lambda=2$ | $\lambda=3$ | $\lambda=0$ | $\lambda=1$ | $\lambda=2$ | $\lambda=3$ |
| 0 | 0 | 6 | 3 | 9 | 0 | 0 | 1 | 1 |
| 1 | 6 | 0 | 9 | 3 | 1 | 1 | 0 | 0 |

At this time, where the higher layer parameter ul-DMRS-IFDMA is configured, and the latest UL DCI includes a cyclic shift mapping-related field (e.g., Cyclic Shift Field mapping table for DMRS bit field) indicating the use of Table 13, PUSCH mapping to the resource element (RE) (e.g., (k, l)) may be performed in the order of first increasing k for all the k values (i.e., frequency resource index) meeting k mod 2=$\bar{\omega}$. Here, for the normal cyclic prefix, 1=3 and, for the extended cyclic prefix, 1=2, and $\bar{\omega}$ may be given by Table 13 above.

For the subslot-unit PUSCH, PUSCH mapping to the resource element may be performed in the order of first increasing k for all the k values except for the case where the cyclic shift mapping-related field is configured in the latest UL DCI format 7 which indicates the use of Table 14. In this mitted (or mapped) in the fifth symbol (i.e., symbol #4) of the slot (i.e., the first slot) for the subslot-unit PUSCH transmission. As another example, where the value of the information for the DMRS pattern of the UL DCI scheduling subslot #4 indicates '11,' it may be set and/or indicated to the UE that the DMRS for the subslot-unit PUSCH transmission is transmitted (or mapped) in the fifth symbol (i.e., symbol #4) of the slot (i.e., the second slot) for the subslot-unit PUSCH transmission.

Table 16 represents another example DMRS transmission (or mapping) symbol index configuration for the subslot-unit PUSCH. It is assumed in Table 16 that subslot-unit PUSCH transmission is set as semi-persistent scheduling (SPS) (e.g., higher layer parameter sps-ConfigUL-sTTI-r15 is set) set with a periodicity (e.g., semiPersistSchedInterva-lUL-STTI-r15 is set to sTTI1) of one subslot.

TABLE 16

| DMRS-pattern field in uplink-related DCI | Uplink subslot number | | | | | |
|---|---|---|---|---|---|---|
| format [3] | #0 | #1 | #2 | #3 | #4 | #5 |
| 00 | 0 | 3 | 5 | 0 | 2 | 4 |
| 10 | 0 | 5 | 5 | 2 | 2 | 4 |

For example, where the value of the information for the DMRS pattern of the UL DCI scheduling subslot #2 indicates '00,' it may be set and/or indicated to the UE that the DMRS for the subslot-unit PUSCH transmission is transmitted (or mapped) in the sixth symbol (i.e., symbol #5) of the slot (i.e., the first slot) for the subslot-unit PUSCH transmission. As another example, where the value of the information for the DMRS pattern of the UL DCI scheduling subslot #2 indicates '10,' it may be set and/or indicated to the UE that the DMRS for the subslot-unit PUSCH transmission is transmitted (or mapped) in the third symbol (i.e., symbol #4) of the slot (i.e., the second slot) for the subslot-unit PUSCH transmission.

Further, in the case of the subslot-unit DMRS set as the SPS with a periodicity larger than one subslot, the above-described DMRS mapping may be started at the symbol I according to the case where the DMRS pattern information in Table 16 is set to '00.' Further, where no symbol (I) values are defined for the UL subslot number, and where there is no valid start symbol index, no reference signal (e.g., DMRS) may be transmitted in association with the UL-related DCI format.

As described above, for the PUSCH scheduled via the DCI (e.g., UL DCI), information for the symbol (i.e., the OFDM symbol) to which the DMRS for the PUSCH is mapped may be dynamically set and/or indicated. In other words, the base station may dynamically set and/or indicate, to the UE, the DMRS mapping position of the PUSCH via, e.g., a UL grant.

In this case, however, the UE's operation may become unclear depending on a specific setting and/or indication combination.

For example, referring to Table 15, if the DMRS pattern information (e.g., DMRS-pattern field) in the DCI (e.g., UL grant DCI) scheduling subslot #1 is indicated as '11,' the UE may recognize the indication as a {D D|R} pattern. Here, 'D,' 'R,' and 'I' may mean the data-mapped symbol, the reference signal (e.g., DMRS)-mapped symbol, and the inter-subslot boundary, respectively. In other words, if the UE receives the indication, the UE may be configured to map PUSCH data to two symbols of subslot #1, map the DMRS to the first symbol of subslot #2, and perform PUSCH transmission.

At this time, additionally, if the DMRS pattern information in the DCI (e.g., UL grant DCI) scheduling subslot #2 is indicated as '01,' the UE may recognize the indication as a {D D} pattern. In other words, if the UE additionally receives the indication, the UE may be configured to map PUSCH data to two symbols of subslot #2 and perform PUSCH transmission.

In this case, since the first symbol (i.e., symbol #5) of subslot #2 has been set for the purpose of DMRS transmission by the prior-received DCI, an ambiguity may occur as to whether to transmit a DMRS or PUSCH data in the symbol in which the UE's settings and/or indications conflict.

As another example, if the DMRS pattern information in the DCI scheduling subslot #2 is indicated as '00' in the above example, the UE may recognize the indication as a {R D} pattern. In other words, if the UE receives the indication, the UE may be configured to map DMRS to the first symbol of subslot #2 and map PUSCH data to the second symbol, and perform PUSCH transmission. In this case, no ambiguity as in the above example arises.

However, if information by the DCI scheduling subslot #1 differs from information by the DCI scheduling subslot #2, an ambiguity may occur in terms of the UE's operations. Here, the information by the DCI scheduling subslot #1 and/or the information by the DCI scheduling subslot #2 may include at least one of cyclic shift information, interleaved frequency division multiple access (IFDMA) comb information, resource allocation information for PUSCH, precoding information, and/or number of layers.

In other words, if the information by the DCI scheduling subslot #1 differs from the information by the DCI scheduling subslot #2, there may occur ambiguity as to which one of the two DCIs is based on for the UE to transmit DMRS at the first symbol of subslot #2 based on the cyclic shift, IFDMA comb, resource allocation, precoding information, and/or number of layers.

Thus, a need exists for operations of the UE receiving inconsistent settings and/or indications in a plurality of DCIs for specific DMRS transmission as described above. To address the above-described ambiguity, proposed below are methods of operation of the UE receiving inconsistent settings and/or indications in a plurality of DCIs for specific DMRS transmission according to the instant embodiment.

Some configurations and/or operations of the methods described below may be replaced, or merged, with configurations and/or operations of other method. Although the description focuses on subslot-unit PUSCH scheduling for ease of description, the methods may also be applicable to scheduling in other transmission time units (e.g., frames, slots, or symbols) and/or other channels (e.g., PDSCH or PUCCH).

Method 1)

It is assumed that the UE receives inconsistent (i.e., non-identical) settings and/or indications in a plurality of DCIs scheduling the PUSCH to be transmitted in subslot #n and subslot #n+k for specific DMRS transmission as described above. Here, n means a positive integer including zero, and k is a positive integer larger than 0. That is, subslot #n+k may mean the kth subslot after subslot #n.

A method that may be considered in this case is to configure the UE to transmit the DMRS using information by the DCI scheduling the PUSCH to be first transmitted (i.e., the PUSCH in subslot #n) among the plurality of DCIs. In other words, the UE may be configured to discard the information by the DCI scheduling the PUSCH to be transmitted later (i.e., the PUSCH in subslot #n+k). At this time, the DMRS may be one transmitted at a specific symbol of subslot #n+k.

For example, where the UE receives inconsistent settings and/or indications via a plurality of DCIs, the UE may transmit the PUSCH (in this case, the DMRS for the PUSCH may also be included) using at least one of the DMRS pattern information, cyclic shift information, IFDMA comb information, resource allocation (e.g., PUSCH RB(s)) information, precoding information, number-of-layers information and/or transmit power control (TPC) information (e.g., TPC field) indicated by the DCI scheduling the PUSCH to be first transmitted among the plurality of DCIs.

Further, in the above case, a rule may be set and/or defined to allow data (i.e., PUSCH data, UL-SCH) not to be transmitted in subslot #n+k.

Method 2)

It is assumed that the UE receives inconsistent (non-identical) settings and/or indications in the plurality of DCIs (i.e., UL DCIs for PUSCH scheduling) received in subslot #n and subslot #n+k for specific DMRS transmission as described above. Here, n means a positive integer including zero, and k is a positive integer larger than 0. That is, subslot #n+k may mean the kth subslot after subslot #n.

A method that may be considered in this case is to configure the UE to transmit the DMRS using information by the DCI first transmitted (i.e., the DCI received in subslot #n) among the plurality of DCIs. In other words, the UE may be configured to discard the information by the DCI later received (i.e., the DCI received in subslot #n+k). At this time, the DMRS may be one transmitted in the transmission time unit (transmission time interval) (e.g., subslot #n+k+m, where m is a positive integer) scheduled by the DCI received in subslot #n+k.

For example, where the UE receives inconsistent settings and/or indications via a plurality of DCIs, the UE may transmit the PUSCH (in this case, the DMRS for the PUSCH may also be included) using at least one of the DMRS pattern information, cyclic shift information, IFDMA comb information, resource allocation (e.g., PUSCH RB(s)) information, precoding information, number-of-layers information and/or TPC information (e.g., TPC field) indicated by the DCI first received among the plurality of DCIs.

Further, in the above case, a rule may be set and/or defined to allow data (i.e., PUSCH data, UL-SCH) not to be transmitted in subslot #n+k.

Figure 20:
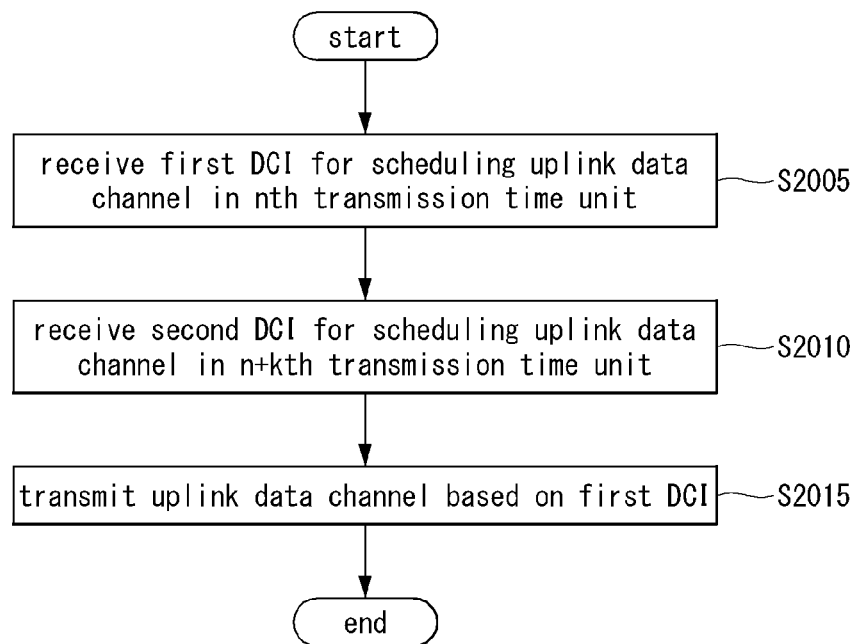
FIG. 20 is a flowchart illustrating example operations of a UE to transmit an uplink data channel to which a method proposed according to an embodiment is applicable.
Figure 21:
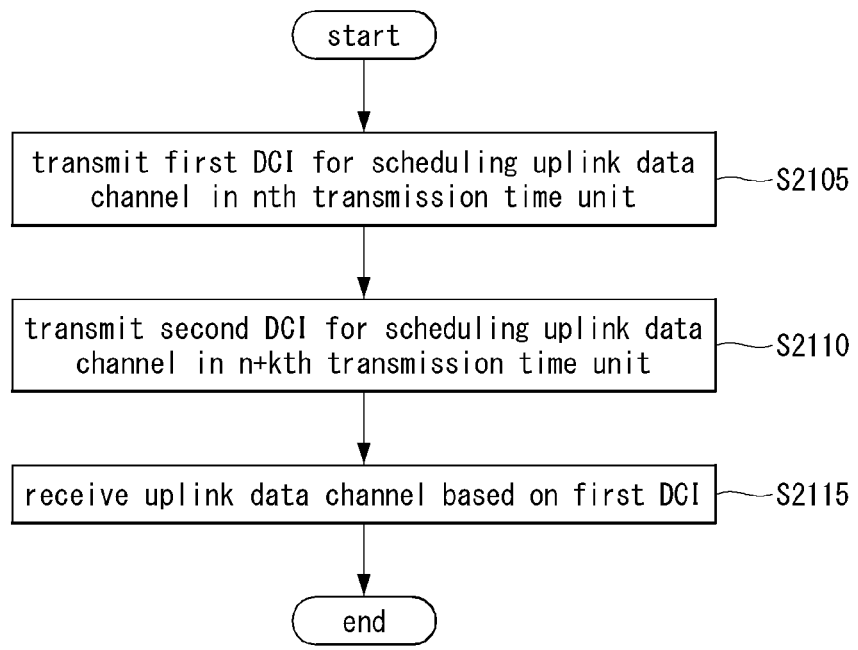
FIG. 21 is a flowchart illustrating example operations of a base station to receive an uplink data channel to which a method proposed according to an embodiment is applicable.

FIGS. 20 and 21 and the following description in connection therewith regard methods and apparatuses for operating a UE and a base station which perform transmission and reception of a data channel (e.g., a PDSCH or PUSCH) as proposed herein. Although the methods of FIGS. 20 and 21 are described in connection with the PUSCH for ease of description, the methods may also be applicable to various data channel and/or demodulation reference signals used in wireless communication systems.

FIG. 20 is a flowchart illustrating example operations of a UE to transmit an uplink data channel to which a method proposed according to an embodiment is applicable. FIG. 20 is intended merely for illustration purposes but not for limiting the scope of the disclosure.

Referring to FIG. 20, it is assumed that the UE and/or base station performs PUSCH transmission/reception in specific transmission time units (e.g., the above-described subslot units) and that PUSCH (i.e., data and/or DMRS) transmission/reception is performed based on the above-described method 1) and/or method 2).

The UE may receive, from the base station, first downlink control information (DCI) for scheduling the uplink data channel in the nth transmission time unit (S2005). For example, the first DCI may correspond to the DCI scheduling the PUSCH to be first transmitted in the above-described method 1) and/or the DCI first received in the above-described method 2).

The UE may receive, from the base station, second downlink control information (DCI) for scheduling the uplink data channel in the n+kth transmission time unit (S2010). For example, the second DCI may correspond to the DCI scheduling the PUSCH to be later transmitted in the above-described method 1) and/or the DCI later received in the above-described method 2).

For example, as in the above-described method 1) and/or method 2), the first DCI and the second DCI each may include at least one of information (e.g., DMRS-pattern field) for the demodulation reference signal (DMRS) pattern related to the uplink data channel, information for the cyclic shift, information for the interleaved frequency division multiple access (IFDMA) comb, information (e.g., PUSCH RB(s)) for resource allocation, information for precoding, information for the number of layers, and/or information (e.g., TPC field) for the TPC.

At this time, there may be an occasion where the information by the first DCI is inconsistent with the information by the second DCI. Here, the information by the first DCI may mean information set and/or indicated by the first DCI, and the information by the second DCI may mean information set and/or indicated by the second DCI.

For example, as in the above-described method 1) and/or method 2), the case where the information by the first DCI is inconsistent with the information by the second DCI may be i) inconsistency in the DMRS pattern information and/or ii) inconsistency in at least one of the cyclic shift information, the IFDMA comb information, resource allocation information, precoding information, number-of-layers information, and/or TPC information (e.g., TPC field).

As a specific example, in the case i) above, the DMRS pattern included in the first DCI may indicate DMRS transmission for the uplink data channel in the first symbol in the n+kth transmission time unit, and the DMRS pattern included in the second DCI may not indicate DMRS transmission for the uplink data channel in the first symbol of the n+kth transmission time unit. Further, in the case ii), the DMRS pattern included in the first DCI and the DMRS pattern included in the second DCI (both) may be presumed to indicate DMRS transmission of the uplink data channel in the first symbol in the n+kth transmission time unit.

As described above, if the information by the first DCI is inconsistent with the information by the second DCI, the UE may transmit the first DCI-based uplink data channel to the base station (S2015). For example, as in the above-described method 1), the UE may transmit the PUSCH (i.e., PUSCH data and/or PUSCH DMRS) based on the DCI scheduling the PUSCH to be first transmitted. As another example, as in the above-described method 2), the UE may transmit the PUSCH (i.e., PUSCH data and/or PUSCH DMRS) based on the first-received DCI. In this case, the second DCI may be discarded (from the transmission of the uplink data channel) by the UE.

Further, as described above, in steps S2005 and S2010 described above, k may be 1, and the nth transmission time unit may be placed continuously with the n+kth transmission time unit.

As described above, the nth transmission time unit and the n+kth transmission time unit each may be a subslot including two or three orthogonal frequency division multiplexing (OFDM) symbols.

In connection with this, in an implementational aspect, the above-described UE operations may be specifically implemented by the UEs 2220 and 2320 shown in FIGS. 22 and 23. For example, the above-described UE operations may be performed by the processors 2221 and 2321 and/or the radio frequency (RF) units (or modules) 2223 and 2325.

In a wireless communication system, a UE receiving a data channel (e.g., a PDSCH) may include a transmitter for transmitting wireless signals, a receiver for receiving wireless signals, and a processor functionally connected with the transmitter and the receiver. Here, the transmitter and the receiver (or transceiver) may be referred to as RF units (or modules) for transmitting and receiving wireless signals.

For example, the processor may control the RF unit to receive, from the base station, the first downlink control information (DCI) for scheduling the uplink data channel in the nth transmission time unit. For example, the first DCI may correspond to the DCI scheduling the PUSCH to be first transmitted in the above-described method 1) and/or the DCI first received in the above-described method 2).

For example, the processor may control the RF unit to receive, from the base station, the second downlink control information (DCI) for scheduling the uplink data channel in the n+kth transmission time unit. For example, the second DCI may correspond to the DCI scheduling the PUSCH to be later transmitted in the above-described method 1) and/or the DCI later received in the above-described method 2).

For example, as in the above-described method 1) and/or method 2), the first DCI and the second DCI each may include at least one of information (e.g., DMRS-pattern field) for the demodulation reference signal (DMRS) pattern related to the uplink data channel, information for the cyclic shift, information for the interleaved frequency division multiple access (IFDMA) comb, information (e.g., PUSCH RB(s)) for resource allocation, information for precoding, information for the number of layers, and/or information (e.g., TPC field) for the TPC.

At this time, there may be an occasion where the information by the first DCI is inconsistent with the information by the second DCI. Here, the information by the first DCI may man information set and/or indicated by the first DCI, and the information by the second DCI may mean information set and/or indicated by the second DCI.

For example, as in the above-described method 1) and/or method 2), the case where the information by the first DCI is inconsistent with the information by the second DCI may be i) inconsistency in the DMRS pattern information and/or ii) inconsistency in at least one of the cyclic shift information, the IFDMA comb information, resource allocation information, precoding information, number-of-layers information, and/or TPC information (e.g., TPC field).

As a specific example, in the case i) above, the DMRS pattern included in the first DCI may indicate DMRS transmission for the uplink data channel in the first symbol in the n+kth transmission time unit, and the DMRS pattern included in the second DCI may not indicate DMRS transmission for the uplink data channel in the first symbol of the n+kth transmission time unit. Further, in the case ii), the DMRS pattern included in the first DCI and the DMRS pattern included in the second DCI (both) may be presumed to indicate DMRS transmission of the uplink data channel in the first symbol in the n+kth transmission time unit.

As described above, if the information by the first DCI is inconsistent with the information by the second DCI, the processor may control the RF unit to transmit the first DCI-based uplink data channel to the base station. For example, as in the above-described method 1), the processor may control the RF unit to transmit the PUSCH (i.e., PUSCH data and/or PUSCH DMRS) based on the DCI scheduling the PUSCH to be first transmitted. As another example, as in the above-described method 2), the processor may control the RF unit to transmit the PUSCH (i.e., PUSCH data and/or PUSCH DMRS) based on the first-received DCI. In this case, the second DCI may be discarded (from the transmission of the uplink data channel) by the UE.

Further, as described above, k may be 1, and the nth transmission time unit may be placed continuously with the n+kth transmission time unit.

As described above, the nth transmission time unit and the n+kth transmission time unit each may be a subslot including two or three orthogonal frequency division multiplexing (OFDM) symbols.

FIG. 21 is a flowchart illustrating example operations of a base station to receive an uplink data channel to which a method proposed according to an embodiment is applicable; FIG. 21 is intended merely for illustration purposes but not for limiting the scope of the disclosure.

Referring to FIG. 21, it is assumed that the UE and/or base station performs PUSCH transmission/reception in specific transmission time units (e.g., the above-described subslot units) and that PUSCH (i.e., data and/or DMRS) transmission/reception is performed based on the above-described method 1) and/or method 2).

The base station may transmit, to the UE, first downlink control information (DCI) for scheduling the uplink data channel in the nth transmission time unit (S2105). For example, the first DCI may correspond to the DCI scheduling the PUSCH to be first transmitted in the above-described method 1) and/or the DCI first received in the above-described method 2).

The base station may transmit, to the UE, second downlink control information (DCI) for scheduling the uplink data channel in the nth transmission time unit (S2110). For example, the second DCI may correspond to the DCI scheduling the PUSCH to be later transmitted in the above-described method 1) and/or the DCI later received in the above-described method 2).

For example, as in the above-described method 1) and/or method 2), the first DCI and the second DCI each may include at least one of information (e.g., DMRS-pattern field) for the demodulation reference signal (DMRS) pattern related to the uplink data channel, information for the cyclic shift, information for the interleaved frequency division multiple access (IFDMA) comb, information (e.g., PUSCH RB(s)) for resource allocation, information for precoding, information for the number of layers, and/or information (e.g., TPC field) for the TPC.

At this time, there may be an occasion where the information by the first DCI is inconsistent with the information by the second DCI. Here, the information by the first DCI may man information set and/or indicated by the first DCI, and the information by the second DCI may mean information set and/or indicated by the second DCI.

For example, as in the above-described method 1) and/or method 2), the case where the information by the first DCI is inconsistent with the information by the second DCI may be i) inconsistency in the DMRS pattern information and/or ii) inconsistency in at least one of the cyclic shift information, the IFDMA comb information, resource allocation information, precoding information, number-of-layers information, and/or TPC information (e.g., TPC field).

As a specific example, in the case i) above, the DMRS pattern included in the first DCI may indicate DMRS transmission for the uplink data channel in the first symbol in the n+kth transmission time unit, and the DMRS pattern included in the second DCI may not indicate DMRS transmission for the uplink data channel in the first symbol of the n+kth transmission time unit. Further, in the case ii), the DMRS pattern included in the first DCI and the DMRS pattern included in the second DCI (both) may be presumed to indicate DMRS transmission of the uplink data channel in the first symbol in the n+kth transmission time unit.

As described above, if the information by the first DCI is inconsistent with the information by the second DCI, the base station may receive the first DCI-based uplink data channel from the base station (S2115). For example, as in the above-described method 1), the base station may receive, from the UE, the PUSCH (i.e., PUSCH data and/or PUSCH DMRS) based on the DCI scheduling the PUSCH to be first transmitted. As another example, as in the above-described method 2), the base station may receive, from the UE, the PUSCH (i.e., PUSCH data and/or PUSCH DMRS) based on the first-received DCI. In this case, the second DCI may be discarded (from the transmission of the uplink data channel) by the UE.

Further, as described above, in steps S2105 and S2110 described above, k may be 1, and the nth transmission time unit may be placed continuously with the n+kth transmission time unit.

As described above, the nth transmission time unit and the n+kth transmission time unit each may be a subslot including two or three orthogonal frequency division multiplexing (OFDM) symbols.

In connection with this, in an implementational aspect, the above-described base station operations may be specifically implemented by the base stations 2210 and 2310 shown in FIGS. 22 and 23. For example, the above-described base station operations may be performed by the processors 2211 and 2311 and/or the radio frequency (RF) units (or modules) 2213 and 2315.

In a wireless communication system, a UE receiving a data channel (e.g., a PDSCH) may include a transmitter for transmitting wireless signals, a receiver for receiving wireless signals, and a processor functionally connected with the transmitter and the receiver. Here, the transmitter and the receiver (or transceiver) may be referred to as RF units (or modules) for transmitting and receiving wireless signals.

For example, the processor may control the RF unit to transmit, to the UE, the first downlink control information (DCI) for scheduling the uplink data channel in the nth transmission time unit. For example, the first DCI may correspond to the DCI scheduling the PUSCH to be first transmitted in the above-described method 1) and/or the DCI first received in the above-described method 2).

For example, the processor may control the RF unit to transmit, to the UE, the second downlink control information (DCI) for scheduling the uplink data channel in the n+kth transmission time unit. For example, the second DCI may correspond to the DCI scheduling the PUSCH to be later transmitted in the above-described method 1) and/or the DCI later received in the above-described method 2).

For example, as in the above-described method 1) and/or method 2), the first DCI and the second DCI each may include at least one of information (e.g., DMRS-pattern field) for the demodulation reference signal (DMRS) pattern related to the uplink data channel, information for the cyclic shift, information for the interleaved frequency division multiple access (IFDMA) comb, information (e.g., PUSCH RB(s)) for resource allocation, information for precoding, information for the number of layers, and/or information (e.g., TPC field) for the TPC.

At this time, there may be an occasion where the information by the first DCI is inconsistent with the information by the second DCI. Here, the information by the first DCI may man information set and/or indicated by the first DCI, and the information by the second DCI may mean information set and/or indicated by the second DCI.

For example, as in the above-described method 1) and/or method 2), the case where the information by the first DCI is inconsistent with the information by the second DCI may be i) inconsistency in the DMRS pattern information and/or ii) inconsistency in at least one of the cyclic shift information, the IFDMA comb information, resource allocation information, precoding information, number-of-layers information, and/or TPC information (e.g., TPC field).

As a specific example, in the case i) above, the DMRS pattern included in the first DCI may indicate DMRS transmission for the uplink data channel in the first symbol in the n+kth transmission time unit, and the DMRS pattern included in the second DCI may not indicate DMRS transmission for the uplink data channel in the first symbol of the n+kth transmission time unit. Further, in the case ii), the DMRS pattern included in the first DCI and the DMRS pattern included in the second DCI (both) may be presumed to indicate DMRS transmission of the uplink data channel in the first symbol in the n+kth transmission time unit.

As described above, if the information by the first DCI is inconsistent with the information by the second DCI, the processor may control the RF unit to receive the first DCI-based uplink data channel from the UE. For example, as in the above-described method 1), the processor may control the RF unit to receive, from the UE, the PUSCH (i.e., PUSCH data and/or PUSCH DMRS) based on the DCI scheduling the PUSCH to be first transmitted. As another example, as in the above-described method 2), the processor may control the RF unit to receive, from the UE, the PUSCH (i.e., PUSCH data and/or PUSCH DMRS) based on the first-received DCI. In this case, the second DCI may be discarded (from the transmission of the uplink data channel) by the UE.

Further, as described above, k may be 1, and the nth transmission time unit may be placed continuously with the n+kth transmission time unit.

As described above, the nth transmission time unit and the n+kth transmission time unit each may be a subslot including two or three orthogonal frequency division multiplexing (OFDM) symbols.

It is apparent that since example schemes proposed herein may be included in one of the implementing methods of the disclosure, they may be regarded as sorts of proposed schemes. The schemes proposed herein may be implemented independently, or some proposed schemes may be combined (or merged) together. A rule may be defined to allow the base station to provide information as to whether to apply the schemes proposed herein (and/or information for the rules of the proposed methods) to the UE via pre-defined signaling (e.g., physical layer signaling and/or higher layer signaling).

Overview of Apparatus to which the Disclosure May be Applied

FIG. 22 illustrates a block diagram of a wireless communication apparatus to which a method proposed in the disclosure may be applied.

Referring to FIG. 22, a wireless communication system includes a base station 2210 and a plurality of user equipments 2220 disposed within the area of the base station 2210.

The base station and the user equipment may be represented as wireless devices, respectively.

The base station 2210 includes a processor 2211, a memory 2212 and a radio frequency (RF) unit 2213. The processor 2211 implements the function, process and/or method proposed in FIGS. 1 to 21. The layers of a radio interface protocol may be implemented by the processor. The memory is connected to the processor, and stores various pieces of information for driving the processor. The RF unit is connected to the processor, and transmits and/or receives a radio signal.

The user equipment 2220 includes a processor 2221, a memory 2222 and an RF unit 2223.

The processor 2221 implements the function, process and/or method proposed in FIGS. 1 to 21. The layers of a radio interface protocol may be implemented by the processor 2221. The memory 2222 is connected to the processor 2221, and stores various pieces of information for driving the processor 2221. The RF unit 2223 is connected to the processor 2221, and transmits and/or receives a radio signal.

The memory 2212, 2222 may be positioned inside or outside the processor 2211, 2221 and may be connected to the processor 2211, 2221 by various well-known means.

Furthermore, the base station and/or the user equipment may have a single antenna or multiple antennas.

The antenna 2214, 2224 functions to transmit and receive radio signals.

FIG. 23 is another example of a block diagram of a wireless communication apparatus to which a method proposed in the disclosure may be applied.

Referring to FIG. 23, a wireless communication system includes a base station 2310 and multiple user equipments 2320 disposed within the base station region. The base station may be represented as a transmission device, and the user equipment may be represented as a reception device, and vice versa. The base station and the user equipment include processors 2311 and 2321, memories 2314 and 2324, one or more Tx/Rx radio frequency (RF) modules 2315 and 2325, Tx processors 2312 and 2322, Rx processors 2313 and 2323, and antennas 2316 and 2326, respectively. The processor implements the above-described functions, processes and/or methods. More specifically, in DL (communication from the base station to the user equipment), a higher layer packet from a core network is provided to the processor 2311. The processor implements the function of the L2 layer. In DL, the processor provides the user equipment 2320 with multiplexing between a logical channel and a transport channel and radio resource allocation, and is responsible for signaling toward the user equipment. The TX processor 2312 implements various signal processing functions for the L1 layer (i.e., physical layer). The signal processing function facilitates forward error correction (FEC) in the user equipment, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each space stream may be provided to a different antenna 2316 through an individual Tx/Rx module (or transmitter and receiver 2315). Each Tx/Rx module may modulate an RF carrier into each space stream for transmission. In the user equipment, each Tx/Rx module (or transmitter and receiver 2325) receives a signal through each antenna 2326 of each Tx/Rx module. Each Tx/Rx module restores information modulated in an RF carrier and provides it to the RX processor 2323. The RX processor implements various signal processing functions of the layer 1. The RX processor may perform space processing on information in order to restore a given space stream toward the user equipment. If multiple space streams are directed toward the user equipment, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 2321.

UL (communication from the user equipment to the base station) is processed by the base station 2310 in a manner similar to that described in relation to the receiver function in the user equipment 2320. Each Tx/Rx module 2325 receives a signal through each antenna 2326. Each Tx/Rx module provides an RF carrier and information to the RX processor 2323. The processor 2321 may be related to the memory 2324 storing a program code and data. The memory may be referred to as a computer-readable medium.

In the disclosure, the wireless device may be a base station, a network node, a transmission terminal, a reception terminal, a radio device, a wireless communication device, a vehicle, an autonomous vehicle, an unmanned aerial vehicle (UAV) or drone, an artificial intelligence (AI) module, a robot, an augmented reality (AR) device, a virtual reality (VR) device, an MTC device, an IoT device, a medical device, a fintech device (or financial device), a security device, a weather/environment device, or a device related to fourth industrial revolution or 5G service. For example, the drone may be an unmanned aerial vehicle that may be flown by wireless control signals. For example, the MTC device and IoT device may be devices that need no human involvement or control and may be, e.g., smart meters, vending machines, thermostats, smart bulbs, door locks, or various sensors. For example, the medical device may be a device for diagnosing, treating, mitigating, or preventing disease or a device used for testing, replacing, or transforming the structure or function, and may be, e.g., a piece of equipment for treatment, surgery, (extracorporeal) diagnosis device, hearing aid, or procedure device. For example, the security device may be a device for preventing possible risks and keeping safe, which may include, e.g., a camera, a CCTV, or a blackbox. For example, the fintech device may be a device capable of providing mobile payment or other financial services, which may include, e.g., a payment device or point-of-sales (PoS) device. For example, the weather/environment device may mean a device that monitors and forecasts weather/environment.

In the disclosure, the term 'terminal' may encompass, e.g., mobile phones, smartphones, laptop computers, digital broadcast terminals, personal digital assistants (PDAs), portable multimedia players (PMPs), navigation, slate PCs, tablet PCs, ultrabooks, wearable devices (e.g., smartwatches, smart glasses, or head-mounted displays (HMDs), or foldable devices. For example, the HMD, as a display worn on the human's head, may be used to implement virtual reality (VR) or augmented reality (AR).

The aforementioned embodiments are achieved by a combination of structural elements and features of the disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the disclosure may be achieved by various means, for example, hardware, firmware, software, or a combination thereof. In a hardware configuration, the methods according to the embodiments of the disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

INDUSTRIAL AVAILABILITY

Although the data transmission/reception schemes in the wireless communication system according to the disclosure have been shown and described in connection with examples applied to 3GPP LTE/LTE-A systems, the disclosure may also be applicable to other various wireless communication systems, e.g., 5G systems, than 3GPP LTE/LTE-A systems.

The invention claimed is:

1. A method performed by a user equipment (UE) in a wireless communication system, the method comprising:
receiving, from a base station, first downlink control information (DCI) for scheduling a Physical Uplink Shared Channel (PUSCH) in an n-th transmission time unit, wherein the first DCI comprises a first DMRS pattern field of 2 bits that indicates a demodulation reference signal (DMRS) transmission in an initial symbol of an (n+k)-th transmission time unit;
receiving, from the base station, second DCI for scheduling the PUSCH in the (n+k)-th transmission time unit, where k is an integer greater than or equal to 1, and wherein the second DCI includes a second DMRS pattern field of 2 bits,
wherein the first DCI further comprises first information regarding at least one of a cyclic shift, an Interleaved Frequency Division Multiple Access (IFDMA) comb, resource allocation, precoding, or a number of layers;
based on the second DMRS pattern field in the second DCI not indicating any DMRS transmission in the initial symbol of the (n+k)-th transmission time unit: discarding the second DCI; and
based on the second DMRS pattern field in the second DCI indicating the DMRS transmission in the initial symbol of the (n+k)-th transmission time unit, with the second DCI further comprising second information regarding at least one of a cyclic shift, an IFDMA comb, resource allocation, precoding, or a number of layers:
based on the first information in the first DCI being inconsistent with the second information in the second DCI:
discarding the second DCI.

2. The method of claim 1, wherein the k is 1, and wherein the nth transmission time unit is placed continuously with the (n+k)-th transmission time unit.

3. The method of claim 1, wherein the nth transmission time unit and the (n+k)-th transmission time unit each are a subslot including two or three orthogonal frequency division multiplexing (OFDM) symbols.

4. A user equipment (UE) in a wireless communication system, the UE comprising:
at least one transceiver for transmitting or receiving a wireless signal; and
at least one processor functionally connected with the at least one transceiver, wherein the at least one processor performs control to:
receive, from a base station, first downlink control information (DCI) for scheduling a Physical Uplink Shared Channel (PUSCH) in an n-th transmission time unit, wherein the first DCI comprises a first DMRS pattern field of 2 bits that indicates a demodulation reference signal (DMRS) transmission in an initial symbol of an (n+k)-th transmission time unit,
receive, from the base station, second DCI for scheduling the PUSCH in the (n+k)-th transmission time unit, where k is an integer greater than or equal to 1, and wherein the second DCI includes a second DMRS pattern field of 2 bits,
wherein the first DCI further comprises first information regarding at least one of a cyclic shift, an Interleaved Frequency Division Multiple Access (IFDMA) comb, resource allocation, precoding, or a number of layers,
based on the second DMRS pattern field in the second DCI not indicating any DMRS transmission in the initial symbol of the (n+k)-th transmission time unit: discard the second DCI, and
based on the second DMRS pattern field in the second DCI indicating the DMRS transmission in the initial symbol of the (n+k)-th transmission time unit, with the second DCI further comprising second information regarding at least one of a cyclic shift, an IFDMA comb, resource allocation, precoding, or a number of layers:
based on the first information in the first DCI being inconsistent with the second information in the second DCI:
discard the second DCI.

5. A base station in a wireless communication system, the base station comprising:
at least one transceiver for transmitting or receiving a wireless signal; and
at least one processor functionally connected with the at least one transceiver, wherein the at least one processor performs control to:

transmit, to a user equipment (UE), first downlink control information (DCI) for scheduling a Physical Uplink Shared Channel (PUSCH) in an n-th transmission time unit, wherein the first DCI comprises a first DMRS pattern field of 2 bits that indicates a demodulation reference signal (DMRS) transmission in an initial symbol of an (n+k)-th transmission time unit, transmit, to the UE, second DCI for scheduling the PUSCH in the (n+k)-th transmission time unit, where k is an integer greater than or equal to 1, and wherein the second DCI includes a second DMRS pattern field of 2 bits, wherein the first DCI further comprises first information regarding at least one of a cyclic shift, an Interleaved Frequency Division Multiple Access (IFDMA) comb, resource allocation, precoding, or a number of layers, based on the second DMRS pattern field in the second DCI not indicating any DMRS transmission in the initial symbol of the (n+k)-th transmission time unit: discard the second DCI, and based on the second DMRS pattern field in the second DCI indicating the DMRS transmission in the initial symbol of the (n+k)-th transmission time unit, with the second DCI further comprising second information regarding at least one of a cyclic shift, an IFDMA comb, resource allocation, precoding, or a number of layers:

based on the first information in the first DCI being inconsistent with the second information in the second DCI:
discard the second DCI.

6. The method of claim 1, wherein the first information includes information regarding a cyclic shift.

7. The method of claim 1, wherein the first information includes information regarding an Interleaved Frequency Division Multiple Access (IFDMA) comb.

8. The method of claim 1, wherein the first information includes information regarding resource allocation.

9. The method of claim 1, wherein the first information includes information regarding precoding.

10. The method of claim 1, wherein the first information includes information regarding a number of layers.

11. The method of claim 1, wherein the second information includes information regarding a cyclic shift.

12. The method of claim 1, wherein the second information includes information regarding an Interleaved Frequency Division Multiple Access (IFDMA) comb.

13. The method of claim 1, wherein the second information includes information regarding resource allocation.

14. The method of claim 1, wherein the second information includes information regarding precoding.

15. The method of claim 1, wherein the second information includes information regarding a number of layers.

* * * * *